US009744460B2

(12) United States Patent
Takeda et al.

(10) Patent No.: US 9,744,460 B2
(45) Date of Patent: Aug. 29, 2017

(54) DEVICE AND METHOD FOR DETERMINING ATTACK POWER BASED ON OPERATING OBJECTS DISPOSED ON A BOARD

(71) Applicant: GungHo Online Entertainment Inc., Chiyoda-ku (JP)

(72) Inventors: Kento Takeda, Chiyoda-ku (JP); Keisuke Watanabe, Chiyoda-ku (JP); Akihiro Nara, Chiyoda-ku (JP); Motoki Kaneda, Chiyoda-ku (JP); Kazuya Honda, Chiyoda-ku (JP); Shimpei Takayanagi, Chiyoda-ku (JP); Kaori Nishio, Chiyoda-ku (JP); Junichi Murakami, Chiyoda-ku (JP); Atsushi Kon, Chiyoda-ku (JP)

(73) Assignee: GungHo Online Entertainment, Inc., Tokyo (JP)

( * ) Notice: Subject to any disclaimer, the term of this patent is extended or adjusted under 35 U.S.C. 154(b) by 279 days.

(21) Appl. No.: 14/633,849

(22) Filed: Feb. 27, 2015

(65) Prior Publication Data

US 2016/0023115 A1 Jan. 28, 2016

(30) Foreign Application Priority Data

Jul. 25, 2014 (JP) ................................. 2014-151759

(51) Int. Cl.
*A63F 9/24* (2006.01)
*A63F 13/58* (2014.01)
(Continued)

(52) U.S. Cl.
CPC .............. *A63F 13/58* (2014.09); *A63F 13/35* (2014.09); *A63F 13/49* (2014.09); *A63F 13/822* (2014.09); *A63F 2003/00996* (2013.01)

(58) Field of Classification Search
CPC .......... A63F 13/10; A63F 13/12; A63F 13/20; A63F 13/45; A63F 13/46; A63F 13/55;
(Continued)

(56) References Cited

U.S. PATENT DOCUMENTS

| 2006/0100020 A1* | 5/2006 | Kasai | ...................... A63F 13/12 463/42 |
| 2013/0331162 A1* | 12/2013 | Krivicich | ............ G06F 3/04812 463/10 |

(Continued)

FOREIGN PATENT DOCUMENTS

| JP | 2006-55312 A | 3/2006 |
| JP | 2006-102275 A | 4/2006 |

(Continued)

OTHER PUBLICATIONS

Nintendo Life, Puzzle & Dragons Z (3DS) Ten Minutes of Gameplay, Jan. 8, 2014, https://www.youtube.com/watch?v=itwzXfxGNVw*

(Continued)

*Primary Examiner* — Jason Yen
(74) *Attorney, Agent, or Firm* — Knobbe Martens Olson & Bear, LLP

(57) ABSTRACT

A system for controlling progress of an electronic game by determining attack power of one or more characters constituting an ally team on the basis of a first player operating a plurality of objects disposed on a board formed by m rows and n columns and displayed on a display unit, applying the attack with the attack power to one or more characters constituting an enemy team, and varying the remaining value of a physical strength parameter related to the character constituting the enemy team. The system can a placement control unit that displays a board including objects operated by the first player superimposed with objects operated by the second player, wherein an order of the (Continued)

superimposition and a display size of the board is varied in accordance with a progress of the electronic game.

23 Claims, 18 Drawing Sheets

(51) Int. Cl.
    *A63F 13/35*     (2014.01)
    *A63F 13/49*     (2014.01)
    *A63F 13/822*     (2014.01)
    *A63F 3/00*     (2006.01)

(58) Field of Classification Search
    CPC ............ A63F 13/69; A63F 13/822; A63F 2003/00996; A63F 2300/308; A63F 2300/61; G07F 17/32; G07F 17/326; G07F 17/3262; G07F 17/3274
    See application file for complete search history.

(56) References Cited

U.S. PATENT DOCUMENTS

| | | | |
|---|---|---|---|
| 2014/0274382 A1* | 9/2014 | Green | A63F 13/12 463/31 |
| 2014/0302935 A1* | 10/2014 | Royce | A63F 13/822 463/42 |
| 2014/0342791 A1* | 11/2014 | Hugh | A63F 13/80 463/9 |
| 2015/0265910 A1* | 9/2015 | Campbell | A63F 3/00097 273/236 |

FOREIGN PATENT DOCUMENTS

| | | |
|---|---|---|
| JP | 2006-254946 A | 9/2006 |
| JP | 5468155 B1 | 2/2014 |
| JP | 2014-76383 A | 5/2014 |

OTHER PUBLICATIONS

Fandom, Puzzle & Dragons Game Mechanics, Apr. 28, 2013, http://pad.wikia.com/wiki/Game_Mechanics.*

148Apps, App Detail Puzzle & Dragons (English), Nov. 11, 2012, http://web.archive.org/web/20121111130543/http://148apps.com/app/563474464.*

Grinnyp, The Adventures of Mary Ann: Lucky Pirates, Aug. 30, 2009, http://jayisgames.com/review/the-adventures-of-mary-ann-lucky-pirates.php.*

Japanese Office Action issued Jan. 6, 2015 in Patent Application No. 2014-151759 (with English Translation).

Puzzle & Dragons Z, Dengeki Nintendo, Kadokawa Corporation, Dec. 21, 2013, vol. 14, No. 2, 7 pages.

* cited by examiner

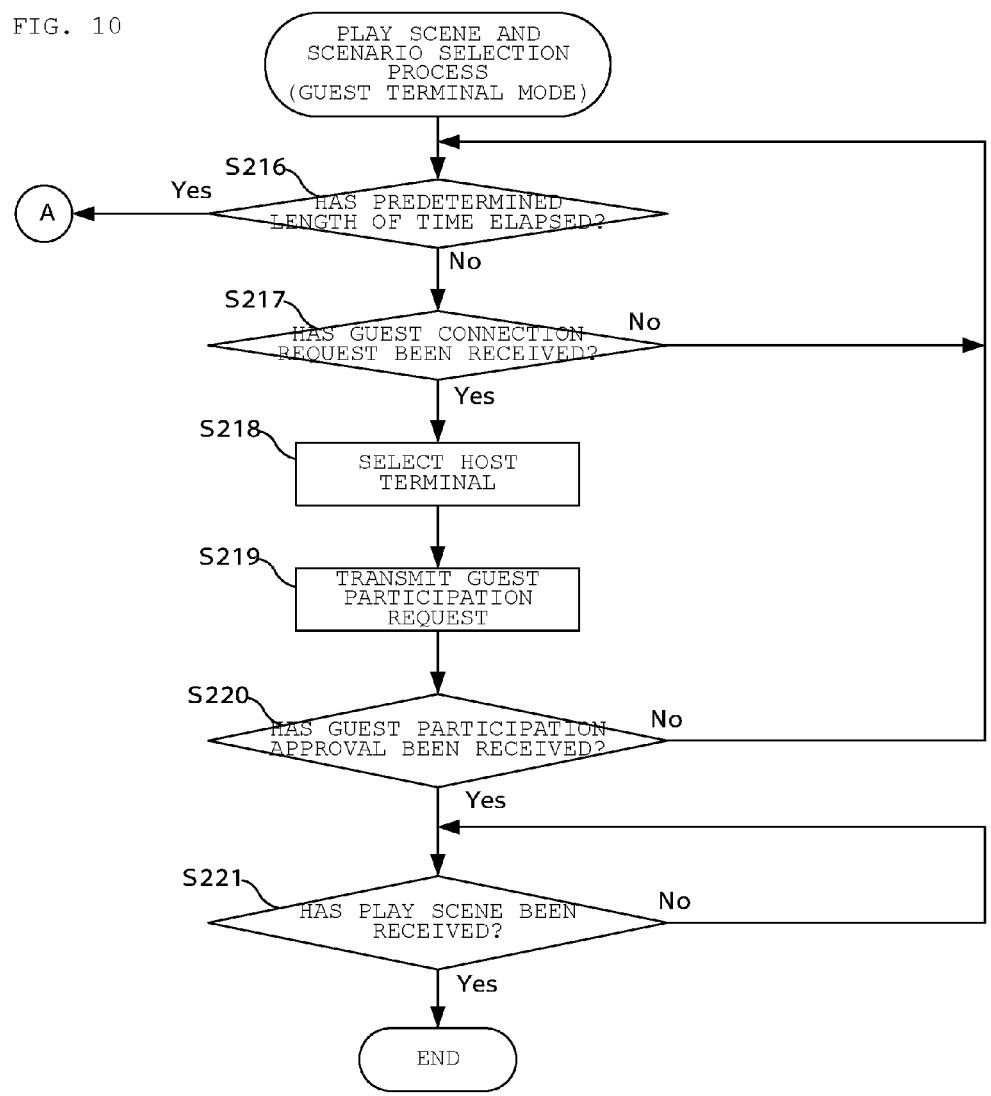

FIG. 11

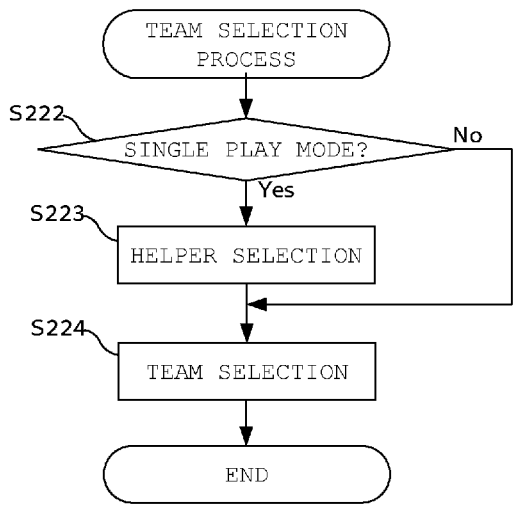

FIG. 12

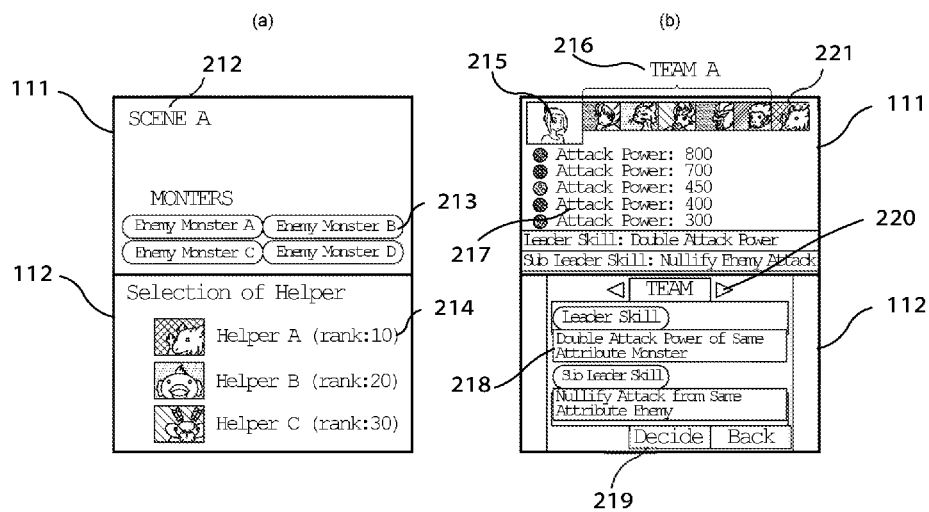

FIG. 13

| CHARACTER GROUP | ATTRIBUTE | TEAM A | TEAM B | TEAM C | TEAM D | BASE ATTACK POWER | BASE RECOVERY POWER | BASE DEFENSE POWER | EXPERIENCE VALUE | SPECIAL ABILITY |
|---|---|---|---|---|---|---|---|---|---|---|
| CHARACTER A | RED | ○ | | ○ | | 500 | 120 | 300 | 50 | DOUBLE ATTACK POWER |
| B | GREEN | ○ | | | ○ | 450 | 100 | 200 | 30 | NULLIFY ENEMY ATTACK |
| C | BLUE | ○ | ○ | | | 300 | 240 | 150 | 46 | DOUBLE RECOVERY POWER |
| D | RED | ○ | ○ | | | 200 | 300 | 400 | 20 | NONE |
| E | PURPLE | ○ | ○ | | ○ | 400 | 100 | 300 | 10 | DOUBLE DEFENCE POWER |
| F | RED | | ○ | | ○ | 300 | 150 | 250 | 60 | INCREASE NUMBER OF ATTACKS |
| G | GREEN | | | | | 350 | 400 | 50 | 30 | DOUBLE ATTACK POWER |
| H | BLUE | | | | | 200 | 50 | 300 | 10 | NULLIFY ENEMY ATTACK |
| I | PURPLE | | | | | 800 | 100 | 150 | 45 | NONE |
| J | RED | | | ○ | | 400 | 200 | 30 | 30 | DOUBLE DEFENCE POWER |
| K | GREEN | | | ○ | | 300 | 300 | 100 | 56 | INCREASE NUMBER OF ATTACKS |
| L | BLUE | | ○ | ○ | ○ | 250 | 150 | 150 | 84 | DOUBLE ATTACK POWER |
| M | YELLOW | | | ○ | ○ | 600 | 250 | 200 | 12 | NULLIFY ENEMY ATTACK |

FIG. 14

| CHARACTER GROUP | ATTRIBUTE | TEAM A | TEAM B | TEAM C | TEAM D | BASE ATTACK POWER | BASE RECOVERY POWER | BASE DEFENSE POWER | EXPERIENCE VALUE | SPECIAL ABILITY |
|---|---|---|---|---|---|---|---|---|---|---|
| CHARACTER A | RED | ○ | | ○ | | 500 | 120 | 300 | 50 | DOUBLE ATTACK POWER |
| B | GREEN | ○ | | | ○ | 450 | 100 | 200 | 30 | NULLIFY ENEMY ATTACK |
| C | BLUE | ○ | ○ | | | 300 | 240 | 150 | 46 | DOUBLE RECOVERY POWER |
| N | YELLOW | ○ | ○ | | | 300 | 200 | 400 | 80 | NONE |
| O | PURPLE | ○ | ○ | ○ | | 400 | 30 | 30 | 20 | DOUBLE DEFENSE POWER |
| P | RED | | ○ | ○ | ○ | 450 | 110 | 600 | 20 | NULLIFY ENEMY ATTACK |
| Q | GREEN | | | ○ | | 350 | 200 | 50 | 5 | DOUBLE RECOVERY POWER |
| R | BLUE | | | ○ | ○ | 800 | 50 | 400 | 60 | NULLIFY ENEMY ATTACK |
| S | PURPLE | | ○ | | ○ | 200 | 100 | 150 | 45 | NONE |

FIG. 15

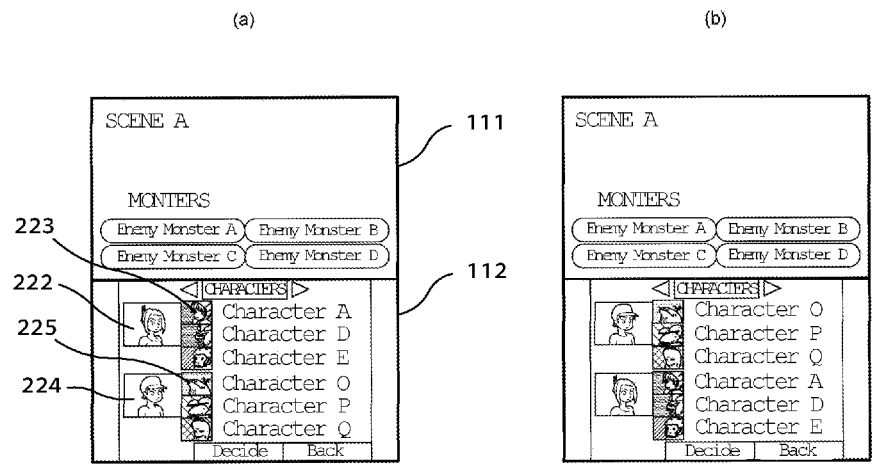

FIG. 16

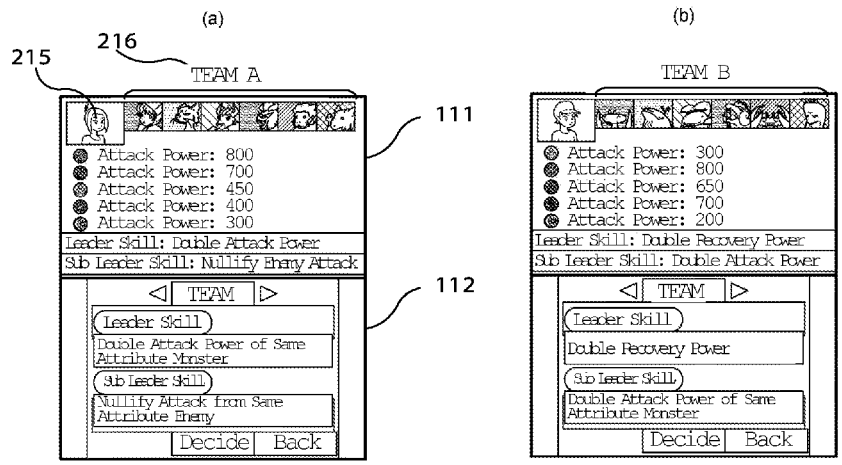

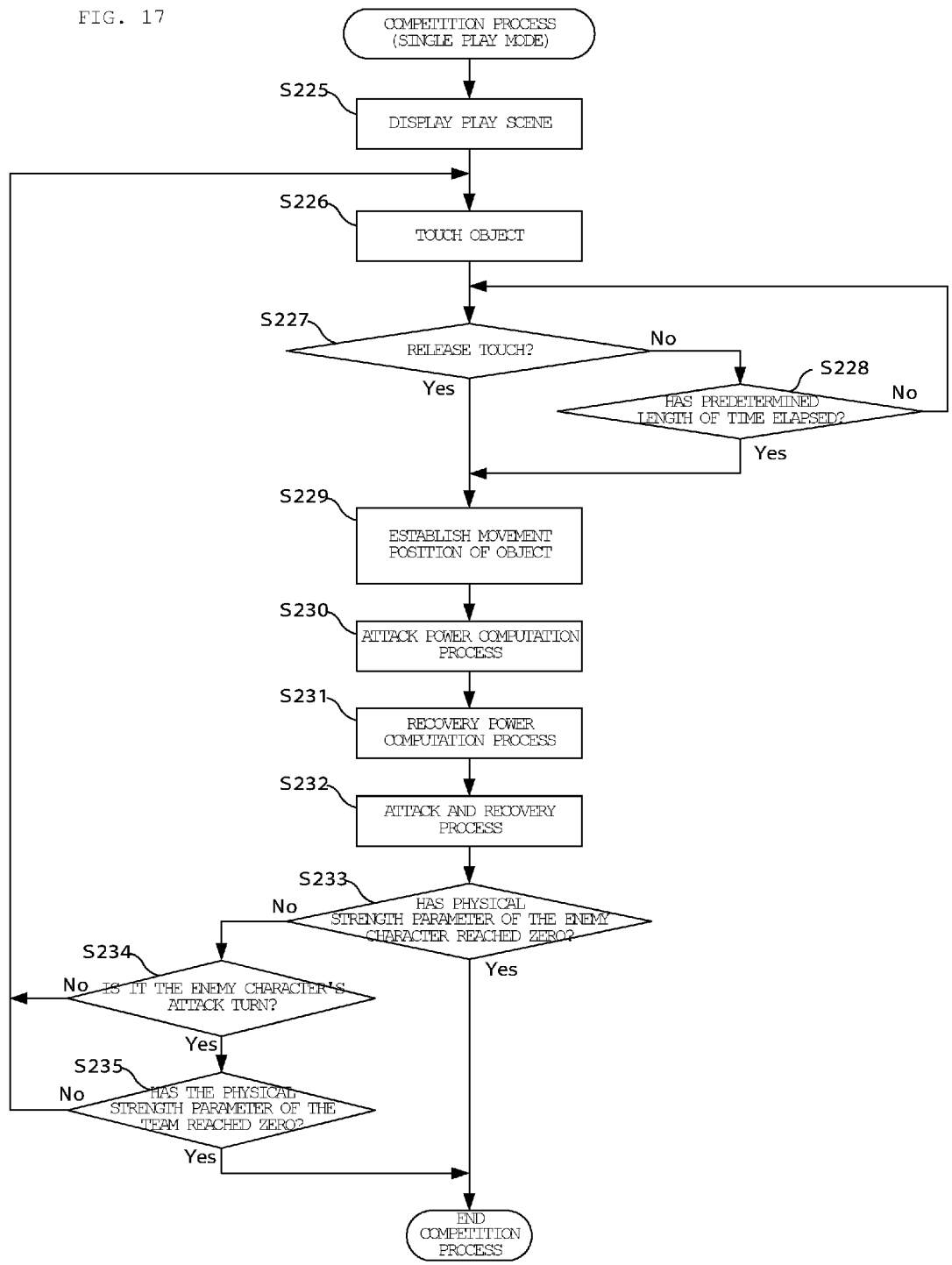

DEVICE AND METHOD FOR DETERMINING ATTACK POWER BASED ON OPERATING OBJECTS DISPOSED ON A BOARD

CROSS-REFERENCE TO RELATED APPLICATION

This application is based upon and claims priority under 35 U.S.C. §119 to Japanese Patent Application No. 2014-151759 filed on Jul. 25, 2014, entitled "TERMINAL DEVICE", the entire contents of which are hereby incorporated herein by reference.

FIELD

The disclosed technology relates to a terminal device for controlling the progress of a game.

BACKGROUND

Known in the art are terminal devices capable of connecting a terminal device owned by a first player and a terminal device owned by another player via communication means to thereby share a game play space. As a mode for sharing play space, it has been disclosed that attack information is generated on the basis of operation on a touch panel provided to the terminal device of the first player and is transmitted to another terminal device connected via the communication means; and meanwhile, similar attack information is received from the other terminal device and predetermined game parameter values are controlled on the basis of the attack information (Patent Document 1).

PRIOR ART REFERENCES

Patent References

Patent Reference 1: Japanese Laid-open Patent Application No. 2006-102275

SUMMARY

However, in the conventional terminal device disclosed in the above-noted patent reference, the touch panel is operated, another player who will be an opponent connected via the communication means is specified, attack information is transmitted to the player, and an attack is imparted. When the first player is specified by the opponent connected via the communication means, an attack is imparted on the first player on the basis of the attack information transmitted from the opponent.

In other words, the other player connected via the communication means is merely an opponent and is not a shared enemy that is to be defeated in cooperation with the other player. A sense of unity with the other player is lacking in a competitive game that includes the other player connected via the communication means.

In view of the above, an object according to various embodiments of the present invention is to provide a game of greater ingenuity that offers a deep sense of unity with another player.

A terminal device according to an aspect of the embodiment is a terminal device for controlling progress of a game by determining attack power of one or more characters constituting an ally team on the basis of a first player operating a plurality of objects disposed on a board formed by m rows and n columns and displayed on a display unit, applying an attack with the attack power to one or more characters constituting an enemy team, and varying the remaining value of a physical strength parameter related to the character constituting the enemy team, the terminal device comprising: an operation unit for receiving operation by the first player; a communication processing unit for processing communication with the terminal device operated by another player; a play mode selection unit for selecting whether to proceed with the game in a single play mode in which the first player competes against the enemy team alone or a multiplay mode in which the first player and another player cooperate to compete against the enemy team; an attack power computation unit that, if single play mode has been selected by the play mode selection unit, computes the attack power on the basis of a result obtained by a plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received via the communication processing unit from the terminal device operated by the other player; and a physical strength parameter processing unit for varying the remaining value of the physical strength parameter on the basis of the attack power computed by the attack power computation unit.

A non-transitory computer-readable medium in which a computer program characterized in causing a computer used as a terminal device operated by a first player according to another aspect of the embodiment controls progress of a game by determining attack power of one or more characters constituting an ally team on the basis of a first player operating a plurality of objects disposed on a board formed by m rows and n columns and displayed on a display unit, applying an attack with the attack power to one or more characters constituting an enemy team, and varies the remaining value of a physical strength parameter related to the character constituting the enemy team is made to vary, the computer program causing the computer to function as: a play mode selection unit for selecting whether to proceed with the game in a single play mode in which the first player competes against the enemy team alone or a multiplay mode in which the first player and another player cooperate to compete against the enemy team; an attack power computation unit that, if single play mode has been selected by the play mode selection unit, computes the attack power on the basis of a result obtained by a plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received from the terminal device operated by the other player; and a physical strength parameter processing unit for varying the remaining value of the physical strength parameter on the basis of the attack power computed by the attack power computation unit.

A server device according to yet another aspect of the embodiment determines attack power of one or more characters constituting an ally team on the basis of a player operating a plurality of objects disposed on a board formed by m rows and n columns, applies an attack with the attack power to one or more characters constituting an enemy team, and controls progress of a game in which the remaining value of a physical strength parameter related to the character constituting the enemy team is caused to vary, the server device comprising: a play mode selection unit for selecting whether to proceed with the game in a single play mode in which a single player competes against the enemy team alone or a multiplay mode in which the single player and another player cooperate to compete against the enemy team; an attack power computation unit that, if single play mode has been selected by the play mode selection unit, computes the attack power on the basis of a result obtained by a plurality of objects disposed on the board being placed in a predetermined state by an operation of the objects via the operation unit of the single player, and, if multiplay mode has been selected by the play mode selection unit, computes the attack power on the basis of the result obtained by the objects being operated via the operation unit of the single player and the result obtained by operation of the objects arranged on the board displayed on the terminal device of the other player; and a physical strength parameter processing unit for varying the remaining value of the physical strength parameter on the basis of the attack power computed by the attack power computation unit.

It is possible to provide, via various embodiments of the present invention, a game of greater ingenuity that offers a deep sense of unity with another player.

BRIEF DESCRIPTION OF THE DRAWINGS

FIG. 10 is a view showing the processing flow for the guest terminal device mode process according to the present embodiment;

FIG. 11 is a view showing the processing flow for the team selection process in the single play mode;

FIG. 12 is a view showing an example of the game image according to the present embodiment;

FIG. 13 is a view schematically showing a configuration example of the character group according to the present embodiment;

FIG. 14 is a view schematically showing a configuration example of the character group stored in the other terminal device;

FIG. 15 is a view showing an example of a game image according to the present embodiment;

FIG. 16 is a view showing an example of a game image according to the present embodiment;

FIG. 17 is a view showing the processing flow for the competition process according to the present embodiment;

DETAILED DESCRIPTION

Embodiments of the present invention will be described with reference to the appended drawings.

First Embodiment

Figure 1:
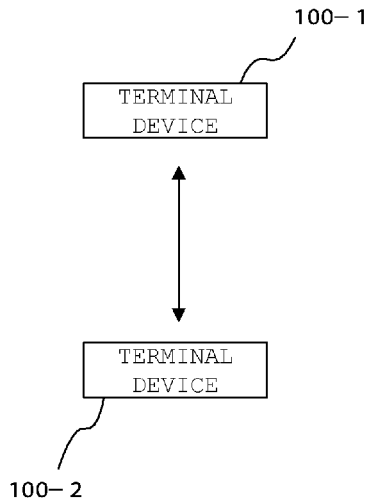
FIG. 1 is a view showing a configuration of a game system according to the present embodiment.

FIG. 1 is a view showing a configuration of a game system including a terminal device 100-1 according to the present embodiment. In FIG. 1, the system is composed of a terminal devices 100-1, 100-2, which are communicably connected to each other via a network. The terminal device 100-1 or 100-2 functions as a host terminal device in accordance with conditions, and the remaining device functions as a guest terminal device.

For example, the terminal device 100-1 functioning as a host terminal device receives results obtained by execution of the game program from the terminal device 100-2 functioning as a guest terminal device, and carries out a variety of types of processes on the basis of the results.

The terminal device may be connected via mobile wireless communication typified by, e.g., Wideband-code division multiple access (W-CDMA), but it is also possible to carry out connection via narrowband wireless communication such as wireless LAN or Bluetooth (registered trademark) as typified by IEEE 802.11. In the present embodiment, the description assumes that wireless communication is carried out, but it is naturally also possible to use communication via a wired connection.

In the present embodiment, an example is shown of two terminal devices 100-1, 100-2, but the number of terminal devices constituting the system is not limited thereto. It is also possible to carry out communication via a server device or a provider device as required.

<Terminal Device>

Figure 2:
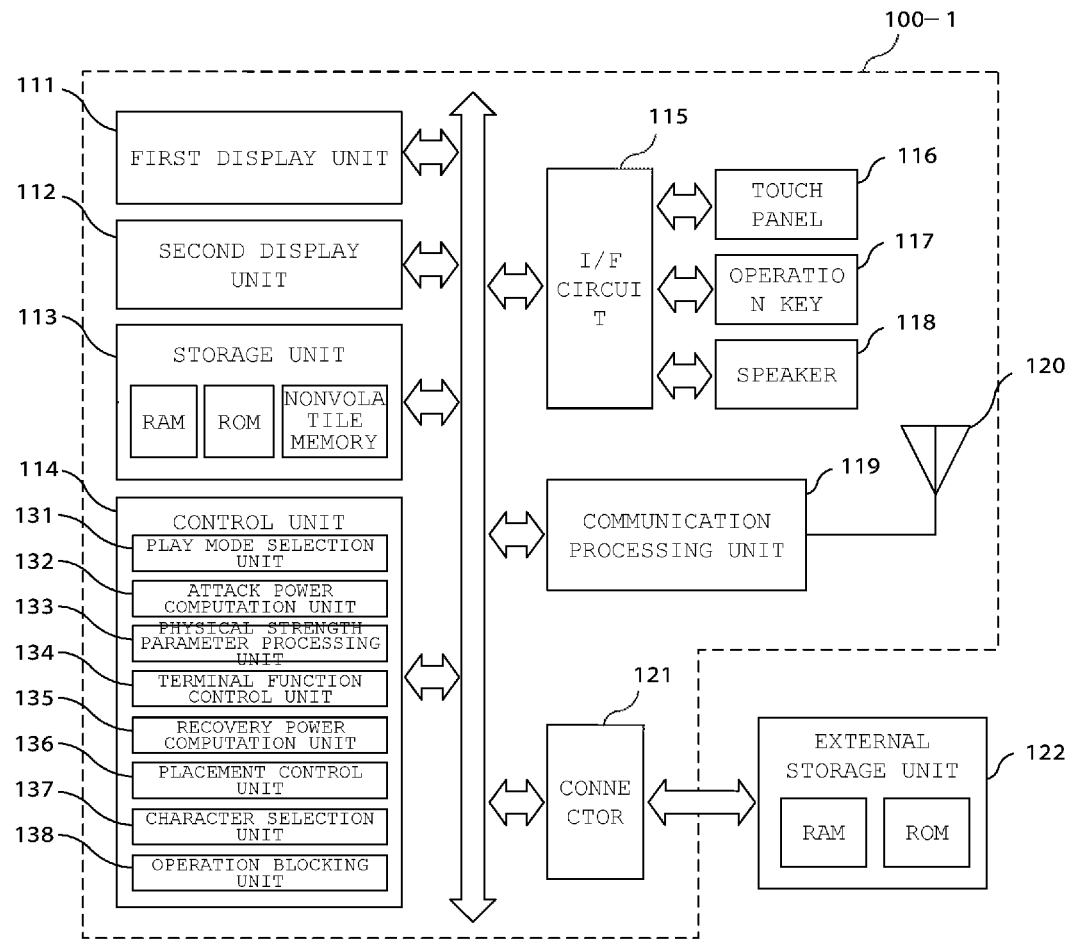
FIG. 2 is a block view showing an example of a configuration of the terminal device according to the present embodiment.

FIG. 2 is a block view showing an example of a configuration of the terminal device 100-1 constituting the system illustrated in FIG. 1. The terminal device 100-1 according to the present embodiment is not required to be provided with all the constituent elements shown in FIGS. 1 and 2, and may have a configuration in which some of the constituent elements are omitted.

Examples of such a terminal device 100-1 includes a stationary game terminal device for executing a game program in connection with an externally provided display unit, a mobile game terminal device having a display unit therein, a mobile communication terminal device such as a smartphone, and a game arcade terminal installed in a game center or the like.

The terminal device 100-1 according to the present embodiment comprises a first display unit 111, a second display unit 112, a storage unit 113 composed of ROM, RAM, or other nonvolatile memory, a control unit 114, a touch panel 116 connected via an I/F circuit 115, an operation key 117, a speaker 118, a communication processing unit 119 for controlling communication via an antenna 120, and a connector 121 connected to an external storage medium 122.

The storage unit 113 includes ROM, RAM, and nonvolatile memory. ROM is memory for storing a program for executing a game program stored in, e.g., the external storage medium 122, and a system (e.g., OS) capable of executing the program. Such a program and system are executed by being loaded by the processing unit (CPU) 114.

RAM is memory used for temporarily reading and writing data while the game program stored in the external storage medium 122 is executed by the control unit 114 various commands generated by executing the program stored in ROM are being processed by the control unit 110.

The nonvolatile memory is used for reading and writing of data by the control unit 114, which executes the game program stored in the external storage medium 122. The data written in the nonvolatile memory remains stored therein even after the game program and the system for executing the game program has ended. Various ability values are typically stored in the nonvolatile memory when the game program is paused or ended, but such values may be stored in the external storage medium 122.

The first display unit 111 and the second display unit 112 display various information including letters, icons, buttons, and other components, as well as boards, objects, characters, and the like as instructed by execution of the game program. An example display unit is composed of a liquid crystal display. In the terminal device 100-1 according to the present embodiment, an example is described in which two display units are provided, but it is possible to provide a single display unit, or three or more display units.

The control unit 114 carries out a variety of types of processes related to the game program on the basis of the game program stored in the external storage medium 122, and includes various functional blocks, i.e., a play mode selection unit 131, an attack power computation unit 132, a physical strength parameter processing unit 133, a terminal function control unit 134, a recovery power computation unit 135, a placement control unit 136, a character selection unit 137, and an operation blocking unit 138.

The play mode selection unit 131 selects whether to run the game in the single play mode in which the player himself (first player) operating the terminal device 100-1 opposes the enemy team displayed on the display units 111, 112, or in the multiplay mode in which the a player (another player) operating the terminal device 100-2 apart from the terminal device being operated by the first player opposes the enemy team displayed on the display units 111, 112 in cooperation with the first player. The play mode selection unit selects whether to run the game in either mode on the basis of an operation signal generated by operation of, e.g., the touch panel 116 or the operation key 117 by a player.

The placement control unit 136 receives an object operation signal generated on the basis of operation of the object via the touch panel 116 or the operation key 117 by the first player, and controls arrangement or deleting of a plurality of objects arranged on the board displayed on the display units 111, 112. For example, the arrangement of the objects is changed to an instructed position if movement of the position of a single object among the plurality of objects has been instructed by the operation signal. If a predetermined number (e.g., three or more) objects having the same attributes are consecutively lined up in a row in the vertical or horizontal direction on the board, those objects are deleted from the display on the board. The objects disposed above the deleted position are made to slide and be arranged in the deleted position on the board. The arrangement control unit deletes the objects from the board if the objects are in a vertically or horizontally in a row, but as shall be apparent, no limitation is imposed thereby. In other words, it is possible to delete the objects if the objects are, e.g., in consecutively lined up in a row for a predetermined number of steps diagonally, or consecutively lined up in a row in a combination of vertical, horizontal and diagonal.

In addition to control of arrangement of objects arranged on the board, the placement control unit 136 controls the display of the board, on which the objects are arranged, on the display units 111, 112. For example, if the multiplay mode is selected using the play mode selection unit 131, the board on which the objects operated by the first player are displayed and the board on which the objects operated by the other player are displayed are superimposed and displayed. The operation signals from the touch panel 116 or the operation key 117 are received, and the display order and order of superimposition of the first player board and the other player board are varied and displayed, and the display size of the board is varied in accordance with the progress of the game.

if the single play mode has been selected in the play mode selection unit 131, the attack power computation unit 132 computes the attack power when an attack is to be imparted to the enemy team, i.e., when variation is to be imparted to the remaining value of the physical strength parameter of the enemy team, on the basis of the results obtained if the plurality of objects arranged on the board by control carried out by the placement control unit 136 are brought to a predetermined state. If the multiplay mode has been selected in the play mode selection unit 131, the attack power computation unit computes the attack power when an attack is to be imparted on the enemy team on the basis of the results obtained if the plurality of objects arranged on the board by control carried out by the placement control unit 136 are brought to a predetermined state and on the basis of the results received from the terminal device 100-2 operated by the other player via the communication processing unit 119.

If the single play mode has been selected in the play mode selection unit 131, the recovery power computation unit 135 computes the variation of, i.e., the recovery power for recovering the remaining value of the physical strength parameter of the ally team on the basis of the results obtained if the plurality of objects arranged on the board by control of the placement control unit 136 are brought to a predetermined state. If the multiplay mode has been selected in the play mode selection unit 131, the attack power computation unit computes the recovery power for recovering the remaining value of the physical strength parameter of the ally team on the basis of the results obtained if the plurality of objects arranged on the board by control carried out by the placement control unit 136 are brought to a predetermined state and on the basis of the results received from the terminal device 100-2 operated by the other player via the communication processing unit 119.

The physical strength parameter processing unit varies, i.e., reduces the remaining value of the physical strength parameter correlated with the enemy team on the basis of the attack power computed by the attack power computation unit 132. The remaining value of the physical strength parameter correlated with the ally team operated by the first player is varied, i.e., reduced if an attack is received with a predetermined attack power from the enemy team. Furthermore, the remaining value of the physical strength parameter correlated with the ally team is recovered on the basis of the recovery power computed by the recovery power computation unit 135.

If the multiplay mode has been selected in the play mode selection unit 131, the terminal function control unit 134 selects whether to cause the terminal device 100-1 operated by the first player to function as the host terminal device for receiving results from the other terminal device 100-2 and carrying out predetermined processing, or to cause terminal device operated by the first player to function as a guest terminal device for transmitting results to the other terminal device 100-2 functioning as the host terminal device and have processing carried out therein. The terminal function control unit 134 selects whether to play the game in either mode on the basis of an operating signal generated by operation of, e.g., the touch panel 116 or the operation key 117 by a player.

The character selection unit 137 selects a character to be used in a competition with an enemy team from among a character group composed of a plurality of characters store in either or both the storage unit 113 and the external storage medium 122. The ally team to be operated by a player is composed of one or more of the characters selected in the character selection unit 137. In the single play mode, the characters are selected from among a character group composed of a plurality of characters stored in the storage unit 113 or the external storage medium 122 inside the terminal device 100-1, but in the multiplay mode, in addition to the above, it is also possible to select characters from among a character group stored in the storage unit and/or external storage medium of the terminal device of the other player.

If the multiplay mode has been selected, the operation blocking unit 138 blocks operation on an object on the board displayed on the display units 111, 112 of the terminal device 100-1 operated by the first player when the other player is operating an object displayed on the terminal device 100-2 operated by the other player, i.e., when control of the arrangement of objects by the placement control unit 136 of the terminal device 100-2 is being carried out. The blocking may be carried out by switching off the function for detecting operation by, e.g., the touch panel 116 or the operation key 117, but may also be carried out by ignoring operation signals received from the touch panel 116 or the operation key 117 in the control unit 114 if such operating signals are received.

The control unit 114 is typically composed of a CPU, but may also include, as required, a GPU for generating image date to be displayed on the display units 111, 112 in accordance with graphic commands (drawing commands) from the CPU. Also, the configuration is not required to be a single CPU and GPU, and, e.g., a plurality of CPUs and/or GPUs may be mounted in accordance with the amount of processing.

The touch panel 116 is provided in superimposed fashion to, e.g., the second display unit, and functions as an operating unit for receiving operations from the player. The information inputted to the touch panel 116 is notified to the control unit 114 via the I/F circuit 115. The touch panel scheme may be a resistive film scheme, an electrostatic capacitance coupling scheme, an ultrasonic surface acoustic wave scheme, or other known scheme. Operations received by the touch panel 116 include control of the board displayed on the display units 111, 112, movement and/or selection of a plurality of objects and characters arranged on the board, and command input for imparting various instructions for controlling the progress of the game.

The operation key 117 functions as an operation unit for receiving operations from the player in similar fashion to the touch panel 116. The information inputted to the operation key 117 is notified to the control unit 114 via the I/F circuit 115. Examples of the operation key include the ten-key pad for inputting numbers and symbols, character keys for inputting alphabet, hiragana, and other characters, and arrow keys, joystick, and the like for indicating movement of the objects displayed on the display units 111, 112 or the like. Operations received by the operation key 117 include control of the board displayed on the display units 111, 112, movement and/or selection of a plurality of objects and characters arranged on the board, and command input for imparting various instructions for controlling the progress of the game.

The speaker 118 replays and outputs background music, sound effects, and the like during execution of the game program stored in the storage unit 113 and the input/output comparison unit 130 via the I/F circuit in accordance with the instructions of the control unit 114.

The communication processing unit 119 modulates and performs a variety of types of processes for transmitting various information stored in the storage unit 113 and the results of processing carried out in accompaniment with the execution of the game program to the other terminal device 100-2 via the wireless communication antenna 120. The communication processing unit also demodulates and performs a variety of types of processes for receiving various information stored in the storage unit 113 of the other terminal device 100-2 and the results of processing carried out in accompaniment with the execution of the game program from the other terminal device 100-2 via the wireless communication antenna 120.

The communication processing unit 119 may carry out processing on the basis of mobile wireless communication typified by, e.g., Wideband-code division multiple access (W-CDMA), but may also possible be carried out on the basis of Bluetooth (registered trademark), or a scheme related to wireless LAN as typified by IEEE 802.11. In the present embodiment, the description assumes that wireless communication is carried out via the wireless communication antenna 120, but, as shall be apparent, also possible to use a scheme or the like related to a wired connection.

The external storage medium 122 is detachably connected to the connector 121, which mediates loading of the game program for controlling execution of the game stored in ROM in the external storage medium 122 and/or various backup data or the like stored in RAM, to the RAM in the storage unit 113.

The game program for controlling execution of a game in an internal ROM and various backup data and the like are stored the external storage medium 122, which is detachably connected to the terminal device 100-1. In the present embodiment, an example will be described in which the game program for controlling execution of the game is stored in the external storage medium 122 and is deployed at any time to the RAM in the storage unit 113 of the terminal device, but the game program may be downloaded from a server to the storage unit 113 of the terminal device 100-1 via a network.

<Game Summary>

The processing carried out by executing the game program according to the present embodiment in the terminal device 100-1 will be described. A typical example of the game program is a so-called competitive role-playing game.

The competitive role-playing game is designed so that a right to challenge the next play scenario is obtained each time a play scenario composed of a plurality of play scenes is cleared. Repeatedly clearing challenges to play scenarios and clearing all prepared play scenarios concludes the game.

Figure 3:
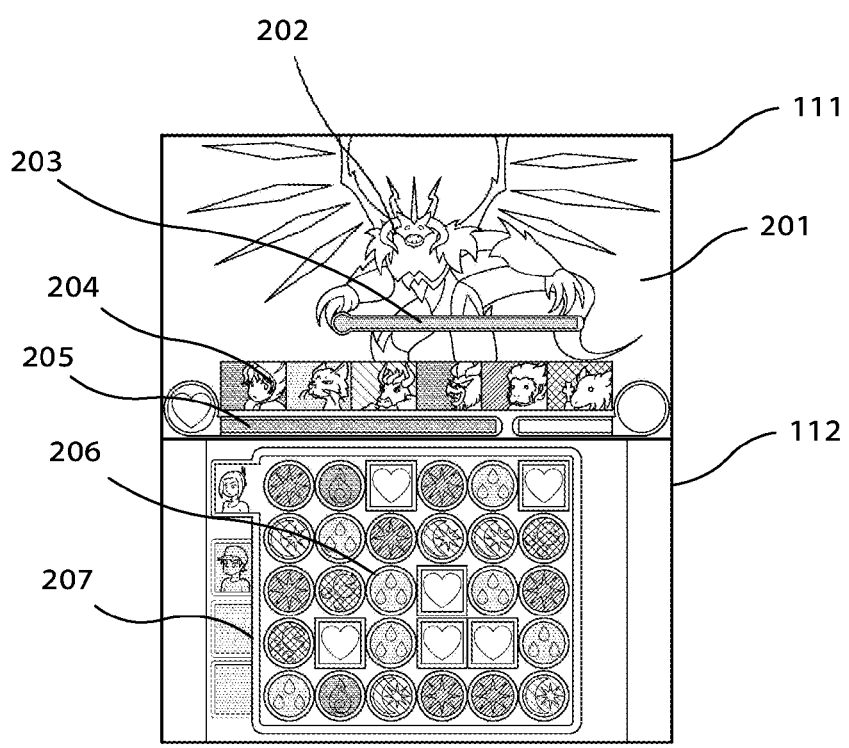
FIG. 3 is a view showing an example of a game image according to the present embodiment.

As used herein, the term "play scene" refers to individual virtual battlefields on which the ally team and enemy team compete. FIG. 3 is a view showing an example of a game image according to the present embodiment as an example of a battlefield and board virtually displayed on the display units 111, 112. In FIG. 3, a space 201 virtually simulating a cave is displayed on the first display unit 111, and the enemy team which includes one or more characters 202 acting as an opponent is displayed in the space 201. An enemy physical strength parameter gauge 203 indicating the remaining value of the physical strength parameter of a character is displayed below each of the characters 202 constituting the enemy team. The ally team which includes one or more characters 204 owned by the player is displayed in the space 201, and an ally physical strength parameter gauge 205 indicating the remaining value of the physical strength parameter of the ally team is displayed therebelow.

A board 207 on which a plurality of objects 206 virtually simulating game pieces is arranged is displayed on the second display unit 112. The board is formed in grid of m rows×n columns (five rows×six columns in FIG. 3). Also, predetermined attributes (e.g., the six attributes of "red," "green," "blue," "yellow," "purple," and "recovery") are imparted in advance to the objects.

Each player can move individual objects 206 to any position on the board 207 by operations via the touch panel 116 or the operation key 117. A predetermined number of (e.g., three) objects having the same attributes are arranged in consecutive fashion in the vertical or horizontal direction on the board to thereby impart an attack on the enemy team with a predetermined attack power. The remaining value of the physical strength parameter of each enemy team character which was under attack is reduced.

On the other hand, an attack is imparted on the ally team with a predetermined attack power from one or more characters 202 constituting the enemy team each time the player moves the an object 206 a predetermined number of times. The physical strength parameter of the ally team which was under attack is reduced.

The team for which the physical strength parameter is entirely exhausted ultimately loses, and a single competitive game ends. Although not particularly depicted, in the present embodiment, victory or defeat is determined only on the basis of the remaining amount of the physical strength parameter, but it is also possible to determine victory or defeat with consideration given to special abilities and other information stored in correlation with each character.

<Processing Flow of the Game Program>

Figure 4:
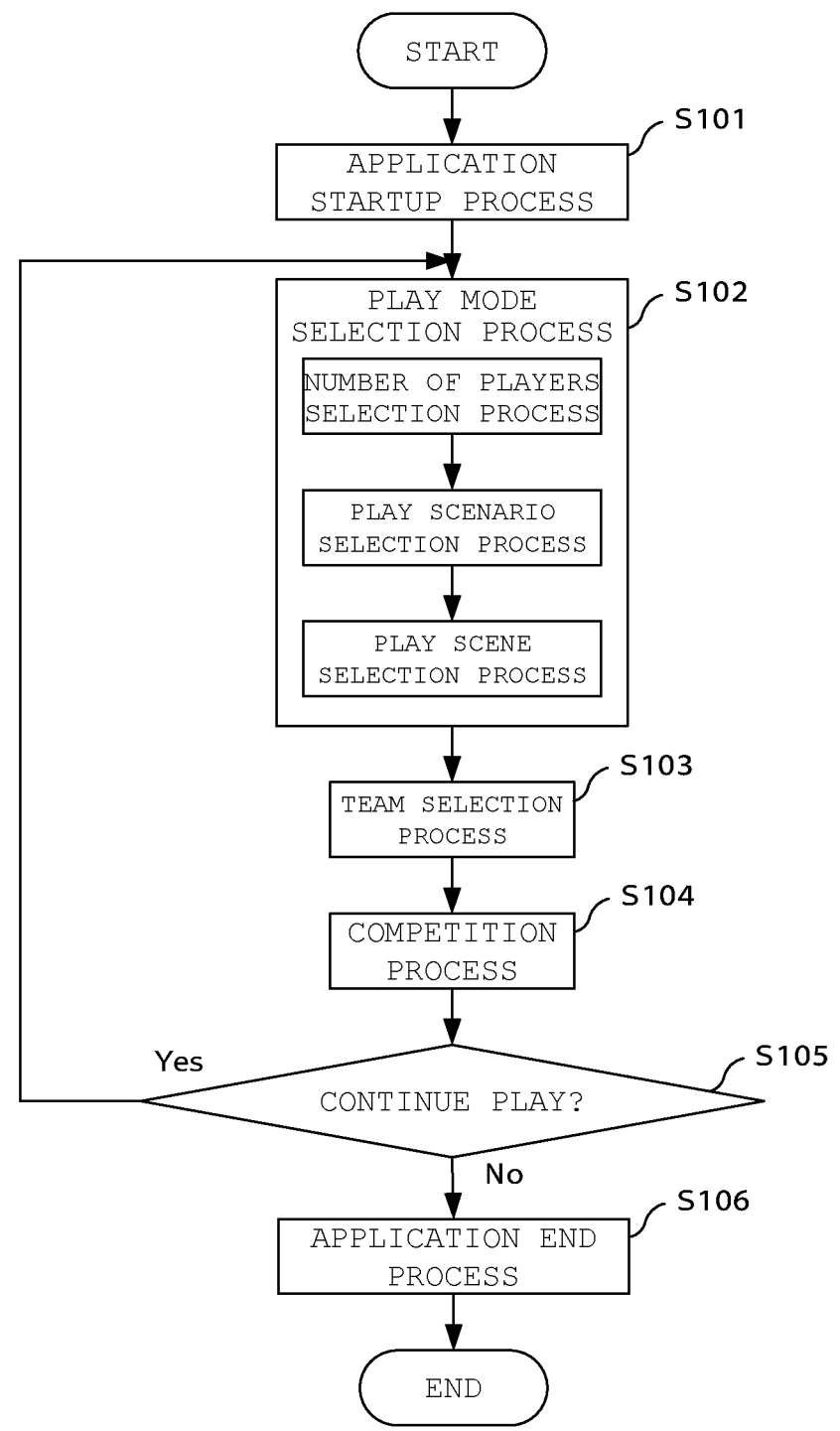
FIG. 4 is a view showing the flow of processing carried out by the control unit 114 on the basis of the game program according to the present embodiment.

FIG. 4 is a view showing the flow of processing carried out by the control unit 114 on the basis of the game program according to the present embodiment. First, an external storage medium 122 in which the game program is stored is inserted into the terminal device 100-1, and a predetermined operation key 117 (e.g., power key or start key) is pressed, whereby the game program is loaded into the storage unit 113, the game program is executed by the control unit 114, and the game is thereby started (S101). An initial screen displaying the title of the game application, various setting icons, a competition game start icon, and the like is displayed on the display units 111, 112.

Next, the player presses the position on the touch panel 116 that corresponds to the competitive game start icon on the initial screen, whereby the control unit 114 performs processing for play mode selection (S102). The play mode selection process is mainly carried out by the play mode selection unit 131 of the control unit 114 to select the single play mode or multiplay mode, the play scenario, the play scene, and the like.

Next, the control unit 114 selects one or more characters to constitute the ally team mainly by way of the character selection unit 137 (S103), and conducts competition against an enemy team using a selected play scene as the battlefield (S104).

If the remaining value of the physical strength parameter of either the ally team or the enemy team reaches zero, the team having a remaining value of the physical strength parameter still remaining is the victor, and a single competitive game ends. Thereafter, the player desires to continue playing the competitive game, the control unit 114 returns again to S102 and carries out the play mode selection process. On the other hand, if the player does not desire to continue, the control unit 114 ends the game application (S106) and ends execution of the game program according to the present embodiment.

The details of various processes in the processing flow above are as follows.

<Play Mode Selection Process>

1. Number of Players Selection Process

Figure 5:
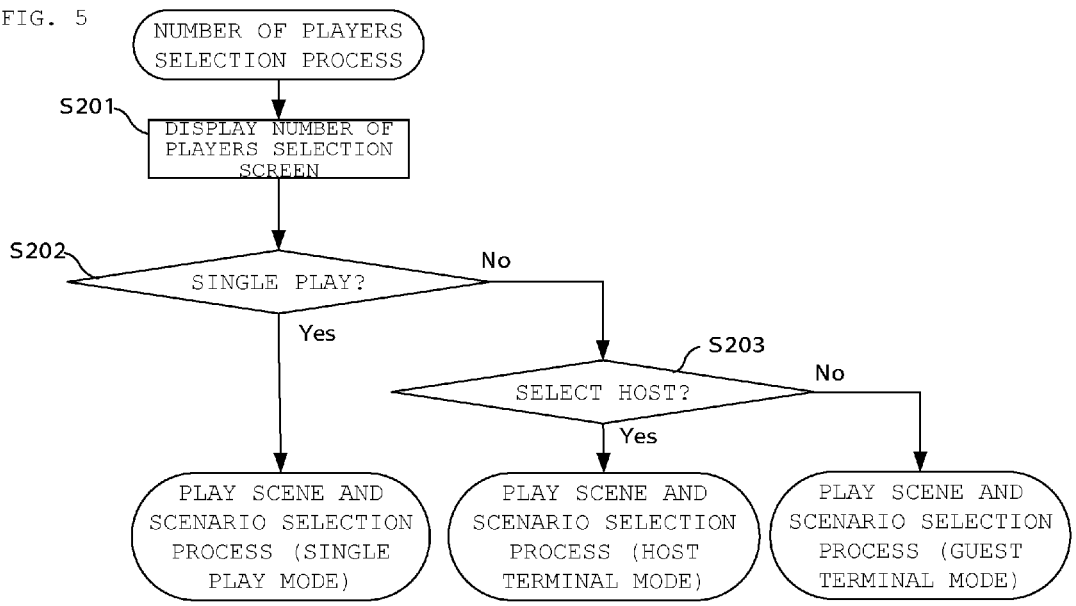
FIG. 5 is a view showing the processing flow for the play mode selection process according to the present embodiment.

FIG. 5 is a view showing the processing flow for the number of players selection process carried out by the control unit 114 in the play mode selection process. The number of players selection process is carried out by the game program mainly causing the control unit 114 to function as a play mode selection unit 131 and a terminal function control unit 134.

First, operation on the competitive game start icon by the player is detected on the initial screen via the touch panel 116, and when the control unit 114 receives the detected operation signal, the control unit 114 starts the number of players selection process.

Figure 6:
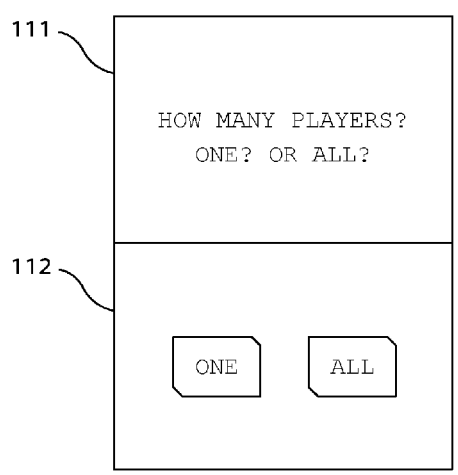
FIG. 6 is a view showing an example of a game image according to the present embodiment.

When the number of players selection process is started, the play mode selection unit 131 of the control unit 114 displays the number of players selection screen shown in FIG. 6 (S201). Specifically, a display prompting the player to select a number of players is shown on the first display unit 111, and an icon for allowing the player to select the number of players is displayed on the second display unit 112. Operation by the player on an icon notated as "One player" is detected via the touch panel 116, the detected operation signal is received by the control unit 114, and the process proceeds to the single play mode (S202). On the other hand, if operation on the icon notated as "Everyone" is detected, the detected operation signal is received by the control unit 114, and the process proceeds to the multiplay mode (S202).

In the multiplay mode, there is host terminal device mode for causing the terminal device 100-1 operated by the player to function as a host terminal device, and a guest terminal device mode for causing the terminal device to function as a guest terminal device. Therefore, the terminal function control unit 134 of the control unit 114 displays the terminal function selection screen on the display units 111, 112, and prompts the player to select use of the terminal device 100-1 operated by the player himself as the host terminal device or as a guest terminal device (S203). If the "Host terminal device mode" has been selected by operation of the touch panel 116 by the player, the terminal function control unit 134 of the control unit 114 generates an operation signal indicating that the host terminal device mode has been selected and starts the play scene and scenario selection process carried out by the host terminal device mode. On the other hand, if the "Guest terminal device mode" has been selected, an operation signal is generated indicating that the guest terminal device mode has been selected and the play scene and scenario selection process carried out by the guest terminal device mode is started.

2. Play Scene and Scenario Selection Process (Single Play Mode)

Figure 7:
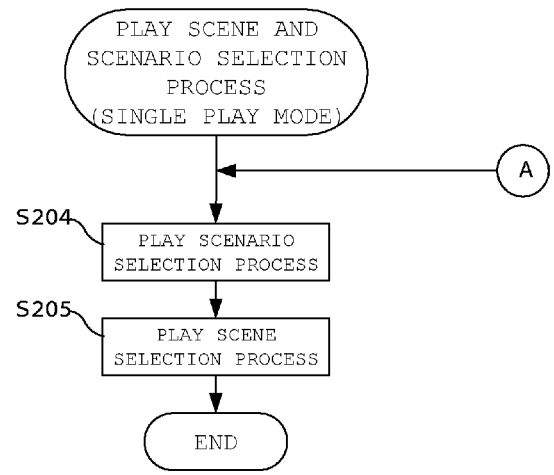
FIG. 7 is a view showing the processing flow for the single play mode process according to the present embodiment.

FIG. 7 is a view showing the processing flow of the play scene and scenario selection process in the single play mode executed by game program causing the control unit 114 to function as a play mode selection unit 131 and the like.

Figure 8:
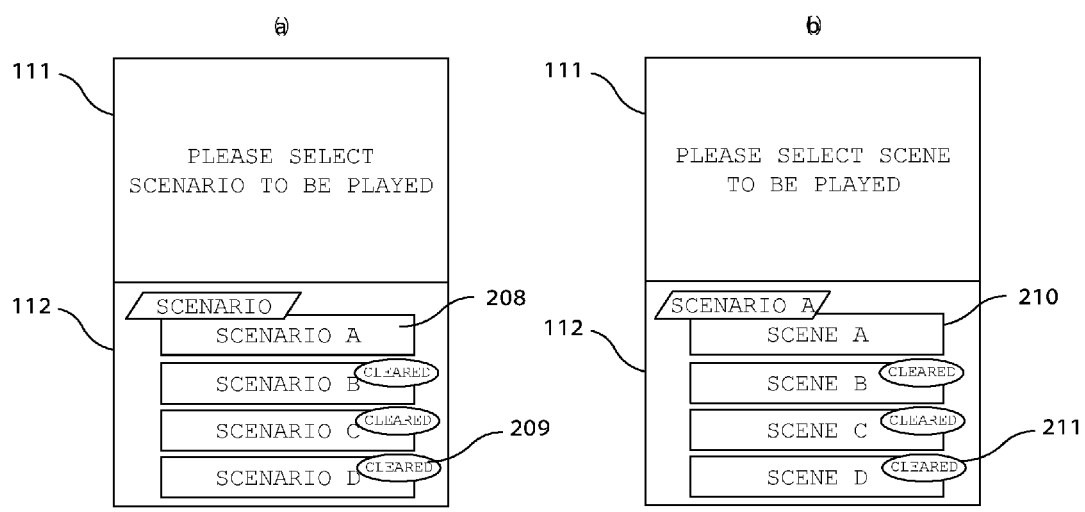
FIG. 8 is a view showing an example of the game image according to the present embodiment.

First, when the play scene and scenario selection process is started, the play mode selection unit 131 of the control unit 114 carries out a process for selecting a play scenario in S204. FIG. 8(a) is a view showing an example of the game image displayed on the display units 111, 112 in the process for selecting the play scenario. In FIG. 8(a), the control unit 114 causes a display prompting the player to select a scenario to be displayed on the first display unit 111, and causes one or more scenario icons 208 to be displayed on the second display unit 112. If the scenario has been cleared once, the control unit 114 causes a clear icon 209 indicating such to be displayed in the upper right of the scenario icon 208. A competition is carried out against an enemy team in one or more scenes included in each scenario, and if victory is achieved in all the competitions in each scene, it is assessed that the scenario has been cleared and the control unit 114 causes a scenario icon 208 corresponding to a new scenario to be displayed.

The player selects the desired scenario in accordance with the scenario icon 208 displayed on the second display unit 112 by operation via the touch panel 116. The play mode selection unit 131 of the control unit 114 selects the play scenario instructed by the player when the operation signal is received.

If the play scenario is selected, the play mode selection unit 131 of the control unit 114 performs processing for selecting a play scene. FIG. 8(b) is a view showing an example of the game image displayed on the display units 111, 112 in the process for selecting the play scene. FIG. 8(b) shown the case in which scenario A has been selected as the play scenario. In FIG. 8(b), the control unit 114 causes a display prompting the player to select a scene to be displayed on the first display unit 111, and causes one or more scene icons 210 to be displayed on the second display unit 112. If the scene has been cleared once, the control unit 114 causes a clear icon 211 indicating such to be displayed in the upper right of the scene icon 210. If victory is achieved against the enemy team in each scene, it is assessed that the scene has been cleared and the control unit 114 causes a scenario icon 210 corresponding to a new scene to be displayed.

The player selects a desired scene in accordance with the scene icons 210 displayed on the display unit 112 by an operation via the touch panel 116. The play mode selection unit 131 of the control unit 114 selects the play scene instructed by the player when the operation signal is received.

The play scene and scenario selection process carried out in the single play mode by the control unit 114 ends by the selection of a play scene, and the process proceeds to the team selection process (S103)

3. Play Scene and Scenario Selection Process (Host Terminal Device Mode)

Figure 9:
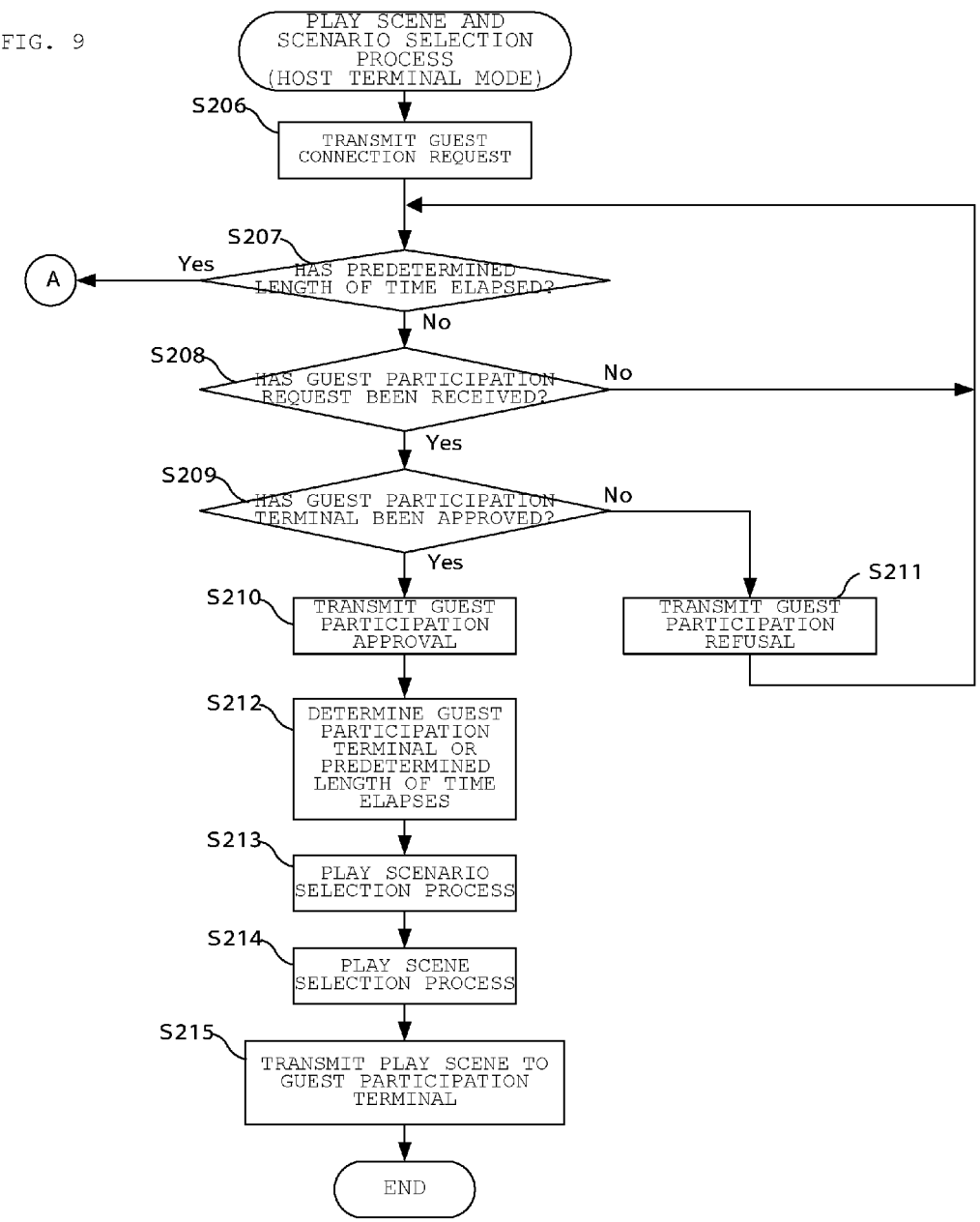
FIG. 9 is a view showing the processing flow for the host terminal device mode process according to the present embodiment.

FIG. 9 is a view showing the processing flow of the play scene and scenario selection process in the host terminal device mode executed by the game program causing the control unit 114 to function as a play mode selection unit 131 and the like.

If the host terminal device mode is selected by the play mode selection unit 131, the terminal function control unit 134 of the control unit 114 controls the communication processing unit 119 so that a guest connection request is transmitted to the other terminal device 100-2 communicably connected to the terminal device 100-1 operated by the first player (S206). The guest connection request includes identification information indicating the first player and a message for recruiting players to participate in the competitive game as a guest terminal device, the message being transmitted to the communicably connected other terminal device 100-2 which executes the same game program.

Next, the terminal function control unit 134 of the control unit 114 assesses whether a predetermined length of time has elapsed from transmitting the guest connection request in S207, and if predetermined length of time has not elapsed, the terminal function control unit confirms whether there has been received from the other terminal device a guest participation request containing a message indicating a desire to participate as a guest terminal device in the competition game and the identification information of the other player desiring participation (S208).

If a guest participation request has been received, the terminal function control unit 134 of the control unit 114 displays the information related to the other player corresponding to the identification information on the display units 111, 112 on the basis of the received identification information, and selects whether to approve participation as a guest terminal device in accordance with an operation from the player (S209). In the case that participation is approved, the terminal function control unit 134 of the control unit 114 causes a guest participation approval message to be transmitted to the terminal device 100-2 of the other player.

Next, in S212, if the player operating the host terminal device instructs an end to recruiting of a guest terminal device by operating the touch panel 116 or the operation key 117 or if the predetermined length of time elapses from the guest connection request being transmitted, the control unit 114 proceeds to the process for selecting a play scenario (S213) and the process for selecting a play scene (S214).

The play scenario selection process in S213 and the play scene selection process in S214 are the same as the play scenario selection process (S204) and the play scene selection process (S205) in the single play mode.

Next, the terminal function control unit 134 of the control unit 114 causes information specifying the play scene selected via S213 and S214 to be transmitted to the approved participating guest terminal (S215), ends the play scene and scenario selection process, and proceeds to the team selection process (S103).

On the other hand, the process returns again to S207 if no guest participation request has been received in S208, and if it has been assessed at that point that the predetermined length of time has already elapsed, the terminal function control unit 134 of the control unit 114 cancels the selection of the multiplay mode by the play mode selection unit 131 and causes the process to return to S204 in FIG. 7 to execute the game in the single play mode. Similarly, if not even one player desiring to participate as a guest has gathered within a predetermined length of time as a result of refusing a guest participation request and transmitting a guest participation refusal message in S209, the control unit cancels the selection of the multiplay mode by the play mode selection unit 131 and causes the process to return to S204 in FIG. 7 to execute the game in the single play mode. In this case, an example was given in which the process returns to S204 in FIG. 7 to execute the game in the single play mode, but no limitation is imposed thereby; it is also possible to, e.g., return to S201 in FIG. 5 and again perform selection of the single play mode and the multiplay mode (host terminal device mode or guest terminal device mode).

4. Play Scene and Scenario Selection Process (Guest Terminal Device Mode)

FIG. 10 is a view showing the processing flow of the play scene and scenario selection process by the guest terminal device mode according executed by the game program causing the control unit 114 to function as a play mode selection unit 131 and the like.

If the guest terminal device mode in the multiplay mode is selected by the play mode selection unit 131, the terminal function control unit 134 of the control unit 114 assesses (S217) whether a guest connection request has been received from another terminal device communicatably connected to the terminal device 100-1 operated by the first player until the predetermined length of time elapses (S216). The terminal function control unit 134 selects a host terminal device for connection in accordance with the operation of the touch panel 116 or the operation key 117 by the player from among the other terminal devices (host terminal devices) for which a transmission of a guest connection request has been received. If there is only one other terminal device for which a transmission has been received, the terminal function control unit 134 automatically selects the other terminal device as the host terminal device.

Next, the terminal function control unit 134 causes the guest participation request to be transmitted to the other selected terminal device (S219). The terminal function control unit stands by (S220) until a guest participation approval message is received from the other terminal device functioning as the host terminal device. Next, if the guest participation approval message is received, the terminal function control unit waits until information specifying the play scene selected by the other terminal device functioning as the host terminal device is received. If the information specified the play scene is received, the play scene and scenario selection process carried out in the guest terminal device mode ends, and the process proceeds to the team selection process (S103).

On the other hand, if a guest connection request could not be received in S217, or if the guest participation approval message could not be received in S220 or the guest participation refusal message is received, the process returns to S216 and again assesses whether the predetermined length of time has elapsed. If it has been assessed that the predetermined length of time has elapsed, selection of the multiplay mode by the play mode selection unit 131 is cancelled and the process is caused to return to S204 in FIG. 7 to execute the game in the single play mode. In such a case, an example was given in which the process is caused to return to S204 in FIG. 7 to execute the game in the single play mode, but no limitation is indicated thereby; it is also possible to, e.g., return to S201 in FIG. 5 and again perform selection of the single play mode and the multiplay mode (host terminal device mode or guest terminal device mode).

<Team Selection Process>

1. Single Play Mode

The team selection process (S103) is carried out when the play scene is determined in the play mode selection process.

FIG. 11 is a view showing the processing flow for the team selection process executed by the game program causing the control unit 114 to function as the character selection unit 137.

First, the character selection unit 137 of the control unit 114 assesses whether the mode is the single play mode or the multiplay mode in the play mode selection process (S222). The process proceeds to S223 if it has been assessed that the mode is the single play mode.

The character selection unit 137 of the control unit 114 carries out the helper selection process in S223. In the game according to the present embodiment, one or more helper characters can be added to the ally team operated by the player if a competition is carried out against an enemy team. The helper character is a character that can be temporarily added as a member of the ally team by player selection or automatic selection by the control unit 114, and a plurality of characters having a predetermined attack power, and special abilities and skills are stored as helper characters in the storage unit 113 or the external storage medium 122. A plurality of helper characters are stored in advance in the storage unit 113 or the like, but it is also possible for the terminal device 100-1 operated by the player to download one or more characters operated by the other player as helper character candidates registered in a serve device or service provider device.

FIG. 12(a) is a view showing an example of the game image displayed on the display units 111, 112 in the helper selection process. In FIG. 12(a), in addition to the information 212 indicating the play scene selected in the play mode selection process, the control unit 114 causes a portion of the enemy characters (enemy monsters A to D) included in the enemy team that are to appear in the play scene to be displayed on the first display unit 111. The control unit 114 selects one or more helper character candidates at random or in accordance with conditions from the helper characters stored in the control unit 114, or receives one or more helper candidates selected at random or in accordance with conditions from a server device or the like, and displays the helper characters in the helper candidate display area 214 on the second display unit 112. FIG. 13 is a view schematically showing a configuration example of the character group stored in the storage unit 113 or the external storage medium 122. For example, the helper character is selected from characters that do not belong to either team (characters without the "○" mark on any of teams A to D).

The character selection unit 137 of the control unit 114 selects, from the helper characters displayed in the helper candidate display area 214, a character to temporarily add to the ally team as a helper character on the basis of an operation signal generated by the player operating the touch panel 116 or the operation key 117, and proceeds to the team selection process (S224).

The ally team operated by the first player in the competitive game is composed of one or more characters selected from the character group stored in the storage unit 113 or the external storage medium 122.

FIG. 13 is a view schematically showing a configuration example of the character group stored in the storage unit 113 or the external storage medium 122. In FIG. 13, character attribute information for each character and information about the team to which the character belongs are correlatively stored in the storage unit 113 or the external storage medium 122. In the present embodiment, a plurality of ally teams (e.g., teams A to D) having different constituting characters is prepared in advance by player selection. FIG. 13 shows that each team is composed of characters affixed with an "○" mark. For example, team A is composed of characters A, B, C, D, and E of a character group. On the other hand, characters G, H, and I are stored in the storage unit 113 or the external storage medium 122 as a character group, but do not belong to any ally team and cannot participate in a competitive game except when selected as a helper character.

In the team selection process, any of the teams A to D can be selected for a competitive game. FIG. 12(b) is a view showing an example of the game image displayed on the display units 111, 112 in the team selection process. In FIG. 12(a), the control unit 114 causes ally team candidates (teams A to D) to be used in the competitive game to be selectably displayed together with an avatar 215 of the first player on the first display unit 111. In this example, team A is being displayed, and the control unit 114 displays characters A to E constituting team A together with the character image 216 corresponding thereto. The control unit 114 identifiably displays by color the background of the character image in accordance with the attribute information of the character.

The control unit 114 displays, in the helper character display area 221, a character image corresponding to the helper character selected in the helper selection process.

The control unit 114 reads out various ability values (base attack power, base recovery power, base defense power, experience value, and the like) of a character from the storage unit 113 or the external storage medium 122 and causes the various ability values to be displayed in an ability display area 217. In the example in FIG. 12(b), the base attack power is summed for each attribute and displayed.

The base attack power is a numerical value used when the attack power applied to a character constituting the enemy team is computed in the attack power computation unit 132 of the control unit 114. The base recovery power is a numerical value used when the recovery power is computed in the recovery power computation unit 135 of the control unit 114. Base defense power is a numerical value used for computing damage received by a character when an attack is received from the enemy team. The experience value increases to a predetermined number for each victory over a competing team, and the base attack power, base recovery power, base defense power, and other ability values can be increased each time the experience value reaches the predetermined number. The special ability is a special skill that each character can demonstrate in certain cases, and is capable of temporarily increasing the attack power or recovery power or other numerical values computed in the attack power computation unit 132 or terminal function control unit 134.

The control unit 114 causes the special ability and description thereof of a single character among the characters constituting the team to be display in a special-ability display area 218 on the second display unit 112. Furthermore, the control unit 114 causes a team change icon 220 to be displayed on the second display unit 112 and causes the displayed ally team candidate to be switched if an operation signal produced by a selection operation by the player is received. For example, if the team change icon 220 is touched once, the display is changed from team A to team B.

When an operation signal by a touch on the team determination icon 219 is received, the control unit 114 selects the team currently displayed as the ally team and proceeds to the competition process (S104).

2. Multiplay Mode

In step S222 of FIG. 11, the process proceeds to the team selection process of S224 without carrying out the helper selection process of S223 when the character selection unit 137 of the control unit 114 has assess the mode to be the multiplay mode.

In the multiplay mode, in addition to the character group stored in the terminal device 100-1 operated by the player, a character is selected from the character group stored in the other terminal device 100-2 functioning as a host terminal device or a guest terminal device communicably connected to the terminal device 100-1 to constitute the ally team.

FIG. 14 is a view schematically showing a configuration example of the character group stored in the other terminal device 100-2. Attributes, which team the character belongs to, the base attack power, the base recovery power, the base defense power, the experience value, and the special ability are correlated with each character included in the character group and are stored in the storage unit or the external storage medium of the terminal device 100-2 in similar fashion to the storage unit 113 and external storage medium 122 of the terminal device 100-1 shown in FIG. 13.

[Example (1) of Team Selection in the Multiplay Mode]

An example of the team selection process in the multiplay mode is for each of the players to select a predetermined of characters to be used in the competition from among the character group stored in the terminal device being operated by the player to form a single team.

In this case, the control unit 114 of the terminal device 100-1 causes a predetermined of characters to be selected from among the character group stored in the storage unit 113 or the external storage medium 122 in the terminal device 100-1 in accordance with the selection operation from the player. When this selection ends, the control unit 114 transmits the information about the selected character (character name, base attack power, base recovery power, attributes, and the like) to the terminal device 100-2 together with the player's own information. Similarly, the control unit of the terminal device 100-2 also causes a predetermined number of characters to be selected from among the character group stored in the storage unit or the like in the terminal device 100-2 in accordance with the selection operation of the other player, and transmits the information about the selected character to the terminal device 100-1 together with the player information of the other player.

In addition to a character selected by the control unit 114, the character selection unit 137 of the control unit 114 causes the characters constituting the ally team operated by the first player to be displayed on the display units 111, 112 on the basis of the character information received from the other terminal device 100-2.

FIG. 15(*a*) is a view showing an example of a game image displayed on the display units 111, 112 of the terminal device 100-1. The first display unit 111 is the same as the display content of the first display unit illustrated in FIG. 12(*a*). On the other hand, the control unit 114 causes an avatar image 222 showing the first player operating the terminal device 100-1, and a character image 223 corresponding to the characters A, D, and E selected by the control unit 114 to be displayed on the second display unit 112. The control unit 114 causes an avatar image 224 showing the player operating the other terminal device 100-2 on the basis of the character information received from the other terminal device 100-2, and a character image 225 corresponding to the received characters O, P, and Q so as to be distinguishable from a character selected by the control unit 114.

FIG. 15(*b*) is a view showing an example of a game image displayed on the display units of the other terminal device 100-2. In this example, the players compete on a shared ally team in the following competition process, and the same display is shown on the display units of the other terminal device 100-2 as the display units 111, 112 of the terminal device 100-1.

In other words, in this case, the character selection unit 137 of the control unit 114 in the terminal device 100-1 constitutes the ally team to be used by the first player using the characters received from the terminal device 100-2 operated by the other player in addition to the characters selected in the terminal device 100-1 operated by the first player. The same process is similarly carried out in the other terminal device 100-2. Consequently, the configuration of the ally team operated by each player in the subsequent competition process is composed entirely of the same characters.

[Example (2) of Team Selection in the Multiplay Mode]

Another example of the team selection process in the multiplay mode is for each of the players to directly use their own teams stored in their own terminal devices in the competitive game. In other words, for example, the player operating the terminal device 100-1 uses any of the teams stored in the storage unit 113 or the external storage medium 122 of the terminal device 100-1.

FIG. 16(*a*) is a view showing an example of a game image displayed on the display units 111, 112 of the terminal device 100-1. As described above, the team to be used in the competition is selected as a team unit from among teams A to D prepared in advance in the storage unit 113 or the external storage medium 122, and the specific selection method and display details are therefore the same as the team selection process in the single play mode, except that the image of the sixth character is displayed in place of the image corresponding to the helper character.

FIG. 16(*a*) is a view showing an example of a game image displayed on the display units of the other terminal device 100-2. As described above, the team to be used is selected as a team unit from among teams stored in advance in the terminal devices, and the display content is therefore different from those of the terminal device 100-1.

In other words, in this case, the character selection unit 137 of the control unit 114 in the terminal device 100-1 constitutes the ally team to be used by the first player from only the characters selected in the terminal device 100-1 operated by the first player. The same process is similarly carried out in the other terminal device 100-2. Consequently, the configuration of the ally team operated by each player in the subsequent competition process is different for each player and is different in terms of the characters constituting the team and the contents of the character image 216 corresponding thereto in FIGS. 16(*a*) and 16(*b*).

As described above, the process proceeds to S104 for the competition process if the team selection process ends in the single play mode or the multiplay mode.

The method described above is not limited in terms of the team selection process. For example, it is also possible to directly use the characters and team selected in the other terminal device 100-2 as the ally team in the terminal device 100-1 operated by the first player.

<Competition Process>

The competition process performs a process that differs depending on whether the single play mode, the host terminal device mode in the multiplay mode, or the guest terminal device mode in the multiplay mode has been selected by the play mode selection unit 131.

1. Single Play Mode

FIG. 17 is a view showing the processing flow for the competition process executed by the game program causing the control unit 114 to function as a attack power computation unit 132, a recovery power computation unit 135, and the like in the case that the single play mode has been selected by the process carried out by the play mode selection unit 131.

First, if the competition process is started, the control unit 114 causes the display containing the play scene serving as a battlefield to be displayed on the display units 111, 112. The content displayed on the display units 111, 112 is as illustrated in FIG. 3.

In other words, the control unit 114 causes the space 201 virtually simulating a cave to be displayed on the first display unit 111, and causes the enemy team which includes one or more characters 202 acting as an opponent to be displayed in the space 201. The enemy physical strength parameter gauge 203 indicating the remaining value of the physical strength parameter of a character is displayed below each of the characters 202 constituting the enemy team. The ally team which includes one or more characters 204 owned by the player is displayed in the space 201, and an ally physical strength parameter gauge 205 indicating the remaining value of the physical strength parameter of the ally team is displayed therebelow.

The control unit 114 causes a board 207 on which a plurality of objects 206 virtually simulating game pieces is arranged is displayed on the second display unit 112. Predetermined attributes (e.g., the six attributes of "red," "green," "blue," "yellow," "purple," and "recovery") are imparted in advance to the objects. These attributes are the same as the attributes imparted in advance to each character constituting the ally team.

Next, if the placement control unit 136 of the control unit 114 detects that the player has touched an object 206 via the touch panel 116 (S226), the touched object 206 is displayed so as to follow the movement of the touch position by a finger and move on the board 207. If it has been detected that the touch operation on the touch panel 116 has been released or that a predetermined length of time has elapsed after the touch, the object 206 is moved to and placed at the position where the object is being displayed at that time (S229).

Next, the attack power computation unit 132 and recovery power computation unit 135 of the control unit 114 carry out an attack computation process (S230) and a recovery power computation process (S231). Specifically, the arrangement on the board after the object has moved is confirmed, and it is assessed whether three or more objects having the same attributes are arranged in consecutive fashion in a row in the vertical or horizontal direction on the board. If a row has not been formed, both processes are ended, the process passes through S232 and proceeds to S233.

Here, the attack power computation process and the recovery power computation process will be described for the case in which three or more objects having the same attributes are arranged in consecutive fashion in a row in the vertical or horizontal direction.

First, if the attack power computation unit 132 detects that three or more objects having the same attributes are arranged in consecutive fashion in a row in the vertical or horizontal direction, the placement control unit 136 causes the consecutive objects in a row to be deleted from the board 207. The placement control unit 136 furthermore arranges new objects that are different from the deleted objects in the position on the board where the deletion occurred. As a result, if three or more objects having the same attributes are again arranged in consecutive fashion in a row in the vertical or horizontal direction, those consecutive objects are deleted from the board. The placement control unit 136 repeats deletion and arrangement of objects on the board until three or more objects having the same attributes are not arranged in consecutive fashion in a row in the vertical or horizontal direction. Repeated arrangement and deletion of objects by the placement control unit 136 is referred to as "chaining."

In the course of arranging and deleting objects carried out by the placement control unit 136, the attack power computation unit 132 counts 1. The number (x) and attributes of the objects deleted at one time,
2. the number of chains, and
3. the attributes of the deleted objects and the number of objects having those attributes during the chaining.

The attack power computation unit 132 acquires the base attack power (K) of the characters having the same attributes as the deleted objects among the characters constituting the ally team from the storage unit 113 or the external storage medium 122. A variable (y) correlated with the number of objects having the same attributes deleted during the chaining and a variable (z) correlated with the number of chains are multiplied with the attack power (K) to thereby compute the attack power that the characters having the attribute impart to the characters of the enemy team. The number (x) and attributes of the objects deleted at one time are used in the physical strength parameter processing unit 133 if the attack target is to be determined.

The variable (y) is increased in proportion to the number objects per attribute deleted during chaining. In other words, the variable (y) varies from "1.00" when three "purple" objects have been deleted, to "1.25" when four have been deleted, and to "1.50" when five have been deleted.

Similarly, the variable (z) is also increased in proportion to the number of chains. In other words, the variable (z) varies from "1.25" when chaining occurs twice, to "1.50" for three occurrences, and to "1.75" for four occurrences.

The computation of the attack power is carried out for each attribute. The attack power calculated herein may be suitably varied in accordance with a special ability of a character constituting the ally team (FIG. 13).

If an object having the attribute "recovery" is included in the objects deleted during chaining, the recovery power computation unit 135 counts the number of those objects deleted.

The recovery power computation unit 135 multiplies a variable (s) correlated with the deleted number of objects having the attribute "recovery," the variable (z) correlated with the number of chains, and a value obtained by summing the base recovery power of the characters constituting the ally team to thereby compute the recovery power for recovering the physical strength parameter of the ally team. The recovery power computed herein may also be suitably varied in accordance with a special ability of a character constituting the ally team (FIG. 13).

When computation in the attack power computation unit 132 and the recovery power computation unit 135 end, the process proceeds to S232, and the attack and recovery processes are carried out in the physical strength parameter processing unit 133. In addition to attack on the enemy team by the ally team, the attack and recovery processes are related to attack on the ally team by the enemy team and recovery of damage imparted thereby.

First, an attack is imparted on the characters 202 constituting the enemy team for each attribute computed by the attack power computation unit 132. The attributes of "red," "green," "blue," "yellow," and "purple" are imparted in advance to the characters constituting the enemy team in the same manner as the characters constituting the ally team, and compatibility information indicating compatibility with the attributes of the characters of the ally team imparting the attack is also stored in advance. The physical strength parameter processing unit 133 determines the damage ultimately received by a character of the enemy team on the basis of the attack power for each attribute and the compatibility information.

The physical strength parameter processing unit 133 reduces the remaining value of the physical strength parameter of the enemy team on the basis of the damage thus determined and changes the display of the enemy physical strength parameter gauge 203.

Here, if the enemy team is composed of a plurality of characters, the physical strength parameter processing unit 133 determines the character of the enemy team to undergo the attack on the basis of player selection in advance or on the basis of the compatibility information. However, if there is an attribute relating to five or more objects being deleted at one time, the attack of a character having that attribute is simultaneously applied all together to all of the enemy characters with reference to the number (x) and attributes of the objects deleted at one time as counted by the attack power computation unit 132.

The physical strength parameter processing unit 133 also controls the remaining value of the play scene of the ally team. In other words, the characters constituting the enemy team apply an attack on the ally team with a predetermined attack power each time the player moves an object 206 a predetermined number of times (in the case of "yes" in S234). In accompaniment therewith, the physical strength parameter processing unit 133 reduces the remaining value of the physical strength parameter of the ally team and changes the display of the ally physical strength parameter gauge 205.

On the other hand, the remaining value of the physical strength parameter thus reduced can be recovered on the basis of the recovery power computed by the terminal function control unit 134. In other words, the physical strength parameter processing unit 133 adds the recovery power computed by the terminal function control unit 134 to the remaining value of the physical strength parameter of the ally team and changes the display of the ally physical strength parameter gauge 205 in accordance therewith.

I the attack and recovery processes end, the control unit 114 assesses whether the remaining value of the physical strength parameter of all the characters constituting the enemy team has reached zero (S233). When it has been assessed that the entire remaining value has reached zero, the competition process ends with a victory for the ally team operated by the first player.

On the other hand, if the remaining value has not reached zero, it is assessed whether the object 206 has been moved by the player a predetermined number of times (S234). If the object has been moved a predetermined number of times, an attack by the characters constituting the enemy team is made on the ally team, and the remaining value of the physical strength parameter of the ally team is reduced by the physical strength parameter processing unit 133.

Next, the control unit 114 assesses whether the remaining value of the physical strength parameter of the ally team has reached zero (S235). If it has been assessed that the remaining value has reached zero, the competition process ends with a loss for the ally team operated by the first player.

The control unit 114 repeats the series of competition processes until the remaining value of the physical strength parameter of the ally team or the enemy team reaches zero.

2. Host Terminal Device Competition Process (Multiplay Mode)

Figure 18:
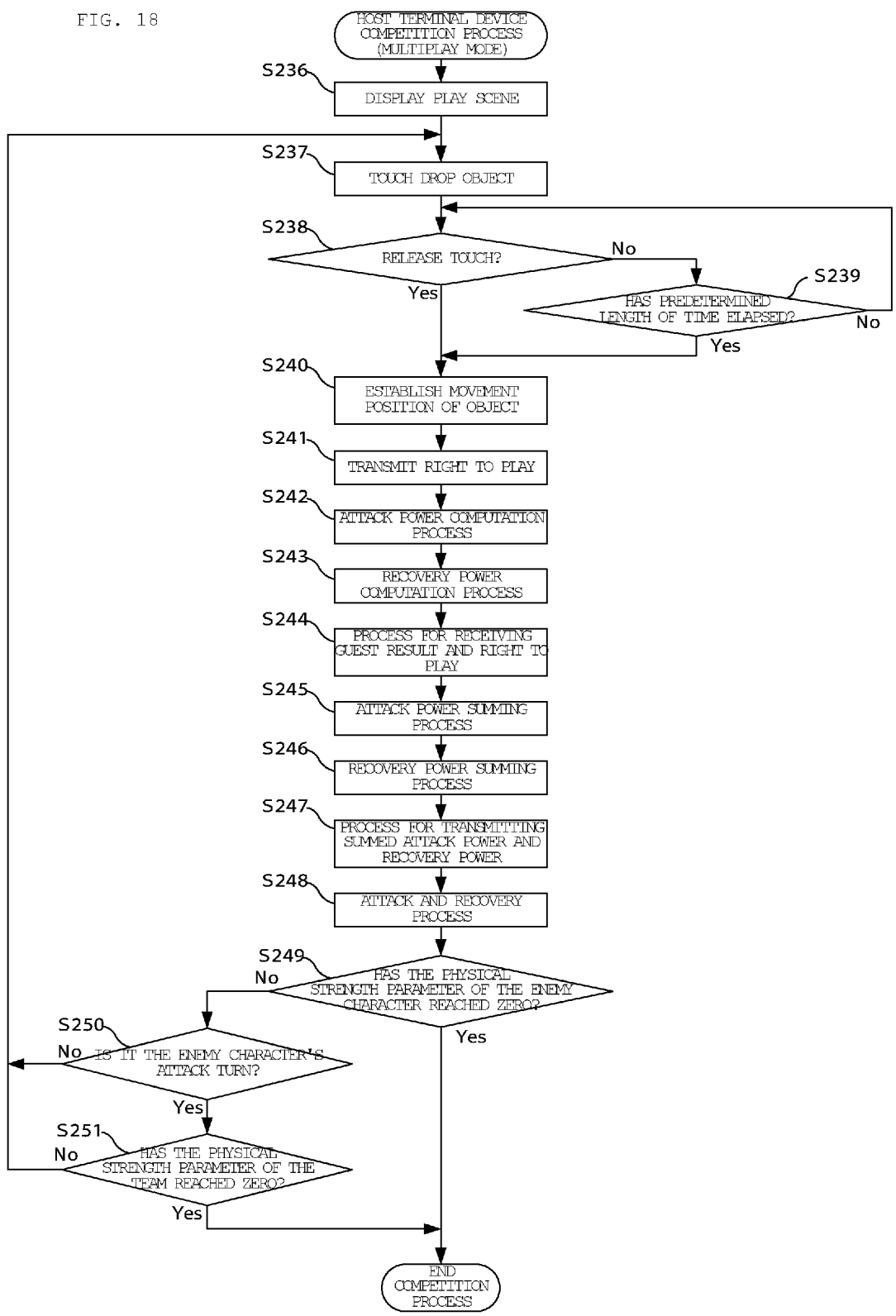
FIG. 18 is a view showing the processing flow for the competition process according to the present embodiment.

FIG. 18 is a view showing the processing flow for the competition process if the host terminal device mode in the multiplay mode has been selected by the processing carried out by the play mode selection unit 131. In other words, in this case, the terminal device 100-1 functions as a host terminal device in the multiplay mode.

First, when the competition process is started, the control unit 114 causes a display containing the play scene serving as the battlefield to be displayed on the display units 111, 112 (S236), and the processing carried out from this point to S240 is the same as S225 to S229 of the competition process in the single play mode.

If the movement position of the object in S240 is established, the control unit 114 transmits (S241) right-to-play information, i.e., information allowing the terminal device 100-2 functioning as the guest terminal device to start operating objects.

The attack power computation unit 132 and the terminal function control unit 134 of the control unit 114 computes (S242 and S243) the attack power and the recovery power for each of attribute on the basis of the arrangement and deletion of the objects 206 carried out by the placement control unit 136. The computation method thereof is the same as that of the attack power computation process (S230) and the recovery power computation process (S231) in the competition process of the single play mode.

When computation of the attack power and the recovery power for each attribute ends, the control unit stands by until the computation result of the attack power and the recovery power for each attribute computed in the terminal device 100-2 are received from the terminal device 100-2 functioning as a guest terminal device. During this standby period, the operation blocking unit 138 of the control unit blocks operation on objects on the board displayed on the second display unit 112 of the terminal device 100-1 operated by the first player when control of the arrangement of the objects is being carried out by the placement control unit of the terminal device 100-2. The method for blocking may be carried out by, e.g., switching off the function for detecting operation by the touch panel 116 or the operation key 117 to block reception itself of the player operation, or may be carried out by ignoring operation signals received from the touch panel 116 or the operation key 117 even when such operation signals are received in the control unit 114. When the computation results are thereafter received in S244, the process proceeds to an attack power addition process of S245 and recovery power addition process of S246 when computation results are received in S244.

In the attack power addition process of S245, the attack power computation unit 132 adds its own computed attack power and the computation results of the attack power received from the guest terminal device 100-2 for each of the attributes. Similarly, in the recovery power addition process of S246, the terminal function control unit 134 adds its own computed recovery power and the computation results of the recovery power received from the guest terminal device 100-2.

In S247, the control unit 114 causes the attack power and the recovery power thus added to be transmitted to the guest terminal device 100-2.

Next, in S248, the physical strength parameter processing unit 133 of the control unit 114 varies the remaining value of the physical strength parameter of each character constituting the enemy team and the remaining value of the physical strength parameter of the ally team on the basis of the attack power and the recovery power of each attribute thus added. At this time, the damage imparted to the enemy characters for each attribute is determined on the basis of the compatibility information of the attributes enemy characters constituting the enemy team in similar fashion to the competition process in the single play mode. In the multiplay mode, the attack power is computed by the attack power addition process with consideration given to the results of the game carried out in the guest terminal device. It is therefore possible to impart greater damage at one time to the characters of the enemy team in comparison with the single play mode.

Although later described, a process is also similarly carried out in the guest terminal device 100-2 to vary the remaining value of the physical strength parameter of each character constituting the enemy team and the remaining value of the physical strength parameter of the ally team on the basis of the added attack power and the recovery power transmitted by the host terminal device 100-1

Next, in S249, the control unit 114 assesses whether the remaining value of the physical strength parameter of all the characters constituting the enemy team has reached zero, and the process carried out up to S251 is the same as S233 to S235 of the competition process in the single play mode.

The control unit 114 repeats the competition process until the remaining value of the physical strength parameter of the enemy team or the ally team reaches zero, and when either reaches zero, the competition process ends with a victory of the other team.

3. Guest Terminal Device Competition Process (Multiplay Mode)

Figure 19:
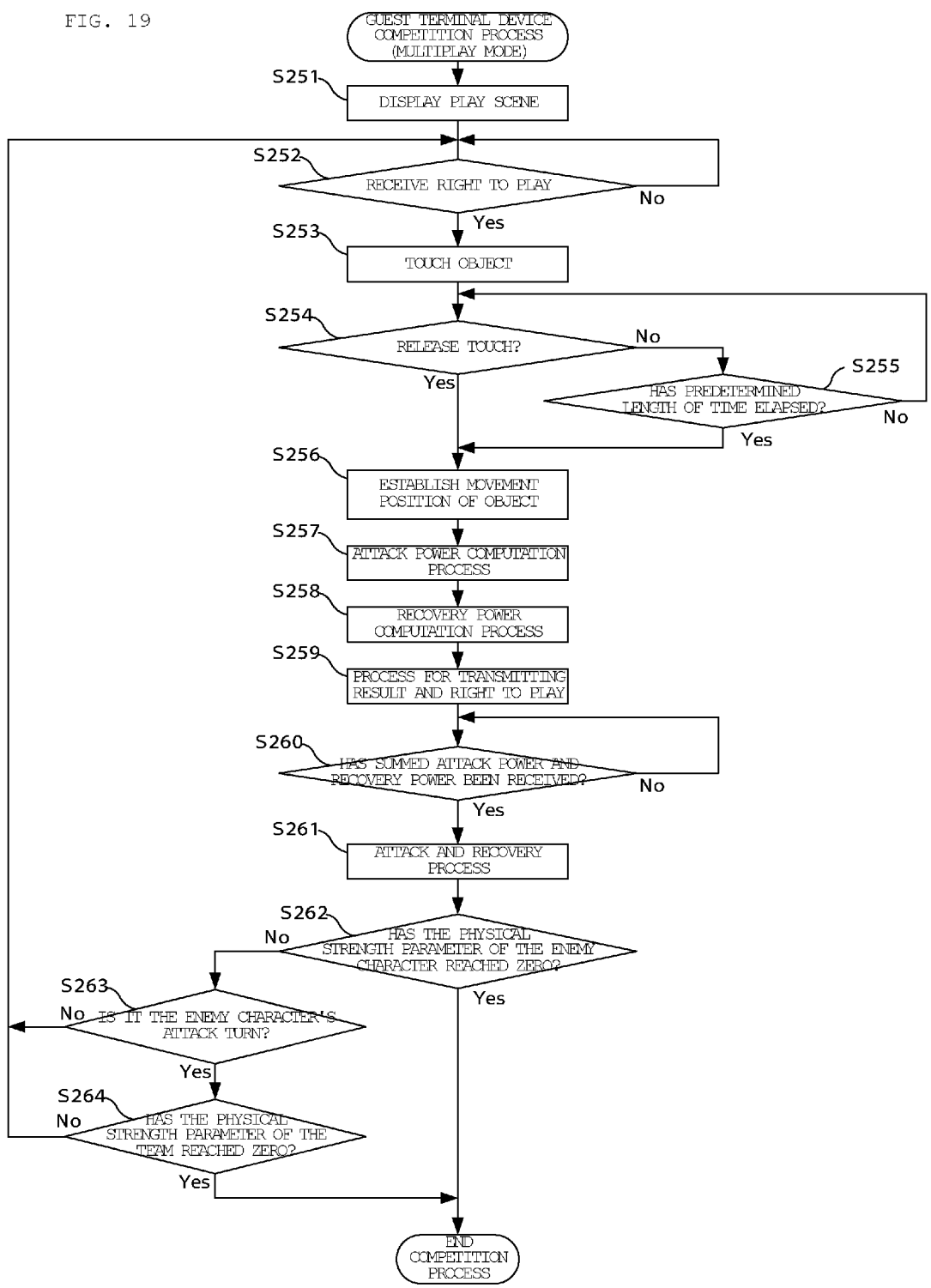
FIG. 19 is a view showing the processing flow for the competition process according to the present embodiment.

FIG. 19 is a view showing the processing flow for the competition process in the case that the guest terminal device mode in the multiplay mode has been selected by the processing carried out by the play mode selection unit 131. In other words, in this case, the terminal device 100-1 functions as a guest terminal device in the multiplay mode, and the terminal device 100-2 functions as the host terminal device.

First, when the competition process is started, the control unit 114 causes a display containing the play scene serving as the battlefield to be displayed on the display units 111, 112 (S251). The process stands by (S252) until the right-to-play information allowing the operation of objects to start in one terminal device 100-1 is received from the other terminal device 100-2 functioning as a host terminal device. During this standby period, the operation blocking unit 138 of the control unit blocks operation on objects on the board displayed on the second display unit 112 of the terminal device 100-1 operated by the first player if control of the arrangement of the objects is being carried out by the placement control unit of the terminal device 100-2.

If the right-to-play information is received from the other terminal device 100-2, the control unit 114 allows operation on the objects on the board displayed on its own second display unit 112, and proceeds to S253. The processing carried out in S253 to S258 is the same as that of S237 to S240, S242, and S243 of the competition process in the host terminal device mode.

If the computation of the attack power imparted to the enemy team and the recovery power to the ally team ends in the attack power computation process of S257 and the recovery power computation process of S258, the control unit 114 transmits the computation results thereof together with the right-to-play information to the terminal device 100-2 functioning as a host terminal device (S259). The control unit stands by (S260) until the result of adding the attack power and recovery power computed in the terminal device 100-1 and its own attack power and recovery power transmitted in S259 is received from the terminal device 100-2 functioning as a host terminal device.

Next, in S261, the physical strength parameter processing unit 133 if the control unit 114 varies the remaining value of the physical strength parameter of characters constituting the enemy team and the remaining value of the physical strength parameter constituting the ally team on the basis of the attack power and recovery power of each attribute thus added. At this time, the damage imparted to the enemy team for each attribute is determined on the basis of the compatibility information with the attributes of the enemy character constituting the enemy team in the same manner as the competition process in the single play mode. In the multiplay mode, the attack power is computed with consideration also given to the results of the game carried out in the host terminal device by the attack power addition process in the terminal device 100-2 functioning as a host terminal device. It is therefore possible to impart greater damage at one time to the characters of the enemy team in comparison with the single play mode.

Next, in S262, the control unit 114 assesses whether the remaining value of the physical strength parameter of all the characters constituting the enemy team has reached zero, and the processing up to S251 is the same as that in S233 to S235 of the competition process in the single play mode.

The control unit 114 repeats the competition process until the remaining value of the physical strength parameter of the enemy team or the ally team reaches zero, and when either reaches zero, the competition process ends with a victory of the other team.

Although not specifically mentioned in the description of sections 2 and 3 above, the arrangement of the board, the remaining value of the physical strength parameter of the ally characters, and information required for processing are constantly exchanged between the terminal device functioning as a host terminal device and the terminal device functioning as the guest terminal device.

4. Modification of the Host Terminal Device Competition Process (Multiplay Mode)

Figure 20:
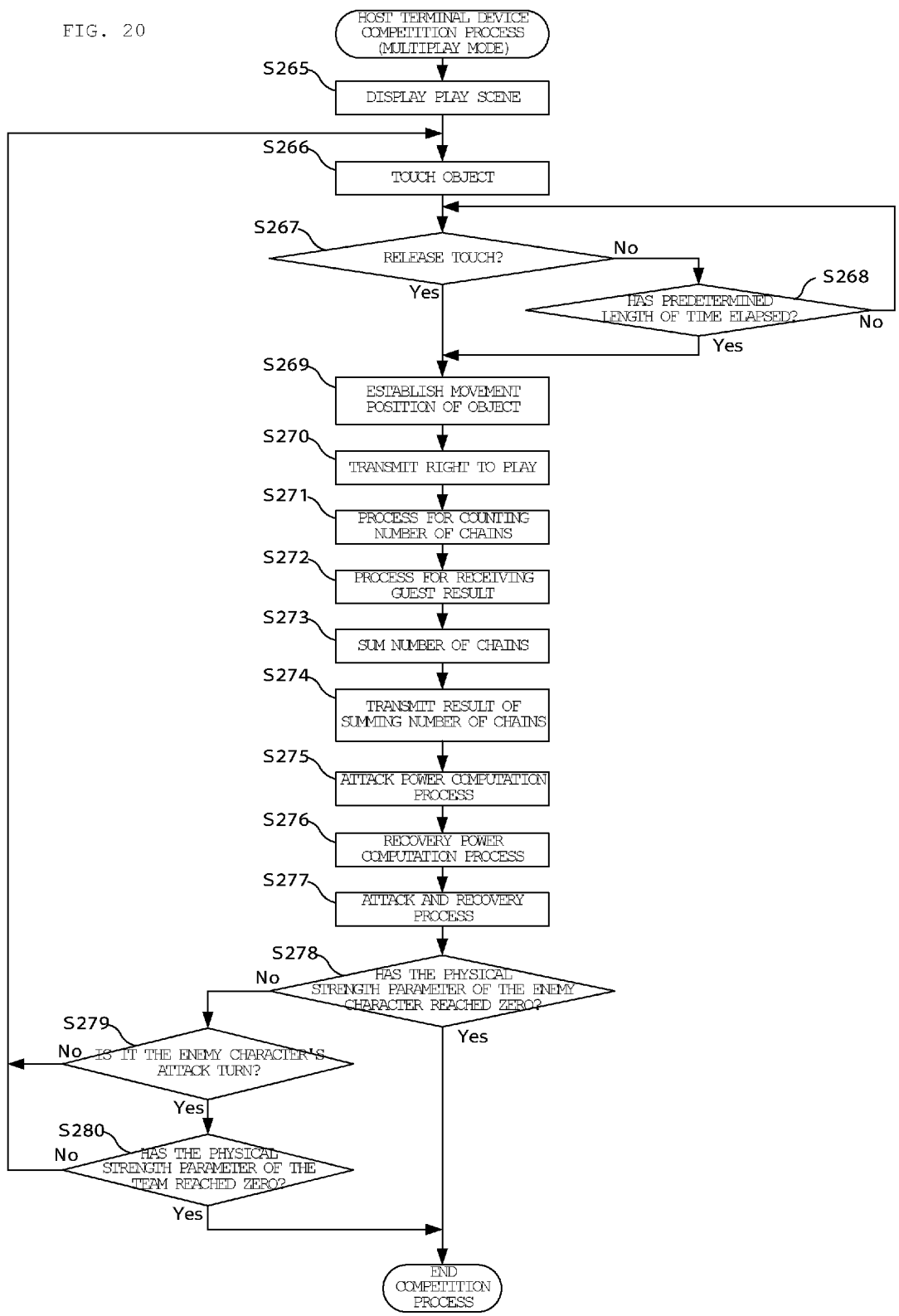
FIG. 20 is a view showing a modification of the processing flow for the competition process.

FIG. 20 is a view showing a modification of the processing flow for the competition process in the host terminal device. The terminal device 100-1 functions as the host terminal device and the terminal device 100-2 functions as the guest terminal device in the same manner as the competition process in the host terminal device in section 2 above.

First, when the competition process is started, the control unit 114 causes a display containing a play scene serving as a battlefield to be displayed on the display units 111, 112 (S265), and the processing carried out from this point up to S270 is the same as that in S236 to S241 of the competition process in the host terminal device in section 2 above.

Next, in S271, the control unit 114 counts the number of chains generated by the placement control unit 136 moving an object. When counting ends, the control unit 114 stands by until the number of chains counted in the terminal device 100-2 is received from the terminal device 100-2 functioning as the guest terminal device. If the number of chains is thereafter received from the terminal device 100-2 in S272, the number of chains counted in the host terminal device 100-1 and the number of chains received from the guest terminal device 100-2 are added in S273, and the result of the addition is transmitted to the terminal device 100-2 in S274.

Next, the attack power computation unit 132 and the recovery power computation unit 135 of the control unit 114 compute the attack power and the recovery power (S275 and S276). First, the attack power computation unit 132 acquires the base attack power (K) of the characters having the same attributes as the deleted objects in the same terminal device from the storage unit 113 or the external storage medium 122 in the same manner as earlier described. A variable (y) correlated with the number of objects having the same attributes deleted during the chaining and a variable (z) correlated with the number of chains are multiplied with the attack power (K) to thereby compute the attack power that the characters having the attribute impart to the characters of the enemy team. The number (x) and attributes of the objects deleted at one time are used in the physical strength parameter processing unit 133 if the attack target is to be determined.

Here, the variable (z) correlated with the number of chains is calculated on the basis of the summed value of the number of chains added in S273, i.e., the number of chains that occurred in the host terminal device and the guest terminal device. Therefore, even if a chain has occurred only five times in one terminal device, the variable (z) is calculated as seven occurrences of chaining as long as there are two occurrences of chaining in the other terminal device. In other words, the ultimately determined attack power is also determined on the basis of the summed value of the number of chains, and it is therefore possible to obtain a greater attack power.

If an object having the attribute "recovery" is included in the objects deleted during chaining, the recovery power computation unit 135 counts the number of those objects deleted.

The recovery power computation unit 135 multiplies the variable (s) correlated with the deleted number of objects having the attribute "recovery," the variable (z) correlated with the number of chains, and a value obtained by summing the base recovery power of the characters constituting the ally team to thereby compute the recovery power for recovering the physical strength parameter of the ally team.

At this time, the variable (z) correlated with the number of chains is calculated on the basis of the number of chains added in S273, i.e., the summed value of the number of chains that occurred in the host terminal device and the guest terminal device. Therefore, even if a chain has occurred only five times in one terminal device, the variable (z) is calculated as seven occurrences of chaining as long as there are two occurrences of chaining in the other terminal device. In other words, the ultimately determined recovery power is also determined on the basis of the summed value of the number of chains, and it is therefore possible to obtain a greater recovery power.

If the attack power and the recovery power are computed in accordance with the above, the control unit 114 carries out an attack and recovery process in accordance with the results thereof (S277). The processing after the attack and recovery processes is the same as that of S248 to S251 of the competition process in the host terminal device in section 2 above.

The control unit 114 repeats the competition process until the remaining value of the physical strength parameter of the enemy team or the ally team reaches zero, and when either reaches zero, the competition process ends with a victory of the other team.

5. Modification of the Guest Terminal Device Competition Process (Multiplay Mode)

Figure 21:
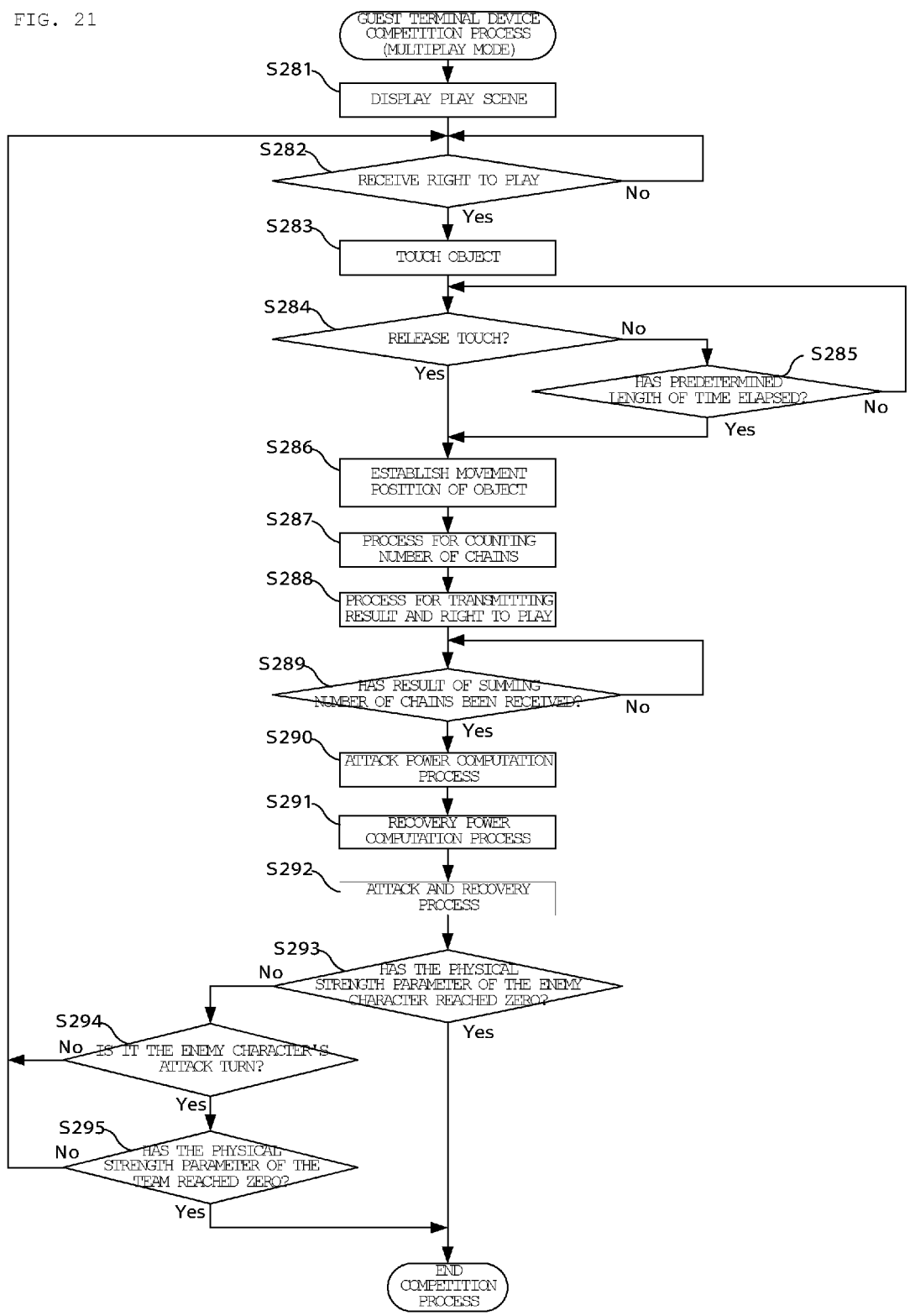
FIG. 21 is a view showing a modification of the processing flow for the competition process.

FIG. 21 is a view showing a modification of the processing flow for the competition process in the guest terminal device. The terminal device 100-1 functions as the guest terminal device and the terminal device 100-2 functions as the host terminal device in the same manner as the competition process in the guest terminal device in section 3 above.

First, when the competition process is started, the control unit 114 causes a display containing a play scene serving as a battlefield to be displayed on the display units 111, 112 (S281), and the processing carried out from this point up to S286 is the same as that in S251 to S256 of the competition process in the guest terminal device in section 3 above.

Next, in S287, the control unit 114 counts the number of chains generated by the placement control unit 136 moving an object. In S288, the count of the number of chains is transmitted to the terminal device 100-2 functioning as the host terminal device together with the right-to-play information. The control unit stands by (S289) until the result of adding the number of chains counted in the host terminal device 100-2 and the number of chains transmitted by the control unit itself in S288 is received from the terminal device 100-2 functioning as the host terminal device.

Next, if the result of the addition is received, the attack power and the recovery power are computed (S290 and S291) in the attack power computation unit 132 and the recovery power computation unit 135 of the control unit 114. First, the attack power computation unit 132 acquires the base attack power (K) of the characters having the same attributes as the deleted objects in the same terminal device from the storage unit 113 or the external storage medium 122 in the same manner as earlier described. A variable (y) correlated with the number of objects having the same attributes deleted during the chaining and a variable (z) correlated with the number of chains are multiplied with the attack power (K) to thereby compute the attack power that the characters having the attribute impart to the characters of the enemy team.

Here, the variable (z) correlated with the number of chains is calculated on the basis of the summed value of the number of chains received in S289, i.e., the number of chains that occurred in the host terminal device and the guest terminal device. Therefore, even if a chain has occurred only twice in one terminal device, the variable (z) is calculated as seven occurrences of chaining as long as there are five occurrences of chaining in the other terminal device. In other words, the ultimately determined attack power is also determined on the basis of the summed value of the number of chains, and it is therefore possible to obtain a greater attack power.

If an object having the attribute "recovery" is included in the objects deleted during chaining, the recovery power computation unit 135 counts the number of those objects deleted.

The recovery power computation unit 135 multiplies the variable (s) correlated with the deleted number of objects having the attribute "recovery," the variable (z) correlated with the number of chains, and a value obtained by summing the base recovery power of the characters constituting the ally team to thereby compute the recovery power for recovering the physical strength parameter of the ally team.

At this time, the variable (z) correlated with the number of chains is calculated on the basis of the number of chains received in S289, i.e., the summed value of the number of chains that occurred in the host terminal device and the guest terminal device. Therefore, even if a chain has occurred only twice in one terminal device, the variable (z) is calculated as seven occurrences of chaining as long as there are five occurrences of chaining in the other terminal device. In other words, the ultimately determined recovery power is also determined on the basis of the summed value of the number of chains, and it is therefore possible to obtain a greater recovery power.

If the attack power and the recovery power are computed in accordance with the above, the control unit 114 carries out an attack and recovery process in accordance with the results thereof (S292). The processing after the attack and recovery processes is the same as that of S262 to S264 of the competition process in the guest terminal device in section 3 above.

The control unit 114 repeats the competition process until the remaining value of the physical strength parameter of the enemy team or the ally team reaches zero, and when either reaches zero, the competition process ends with a victory of the other team.

Although not specifically mentioned in the description of sections 4 and 5 above, the arrangement of the board, the remaining value of the physical strength parameter of the ally characters, and information required for processing are constantly exchanged between the terminal device functioning as a host terminal device and the terminal device functioning as the guest terminal device.

<Host/Guest Terminal Device Screen Transition in Multiplay Mode>

FIGS. 22 to 28 are views showing an example of game screen transition displayed in the host terminal device 100-1 and the guest terminal device 100-2 in the multiplay mode. In the drawings, the image in (a) and the image in (b) represent images displayed in the host terminal device and the guest terminal device, respectively, with the same timing.

Figure 22:
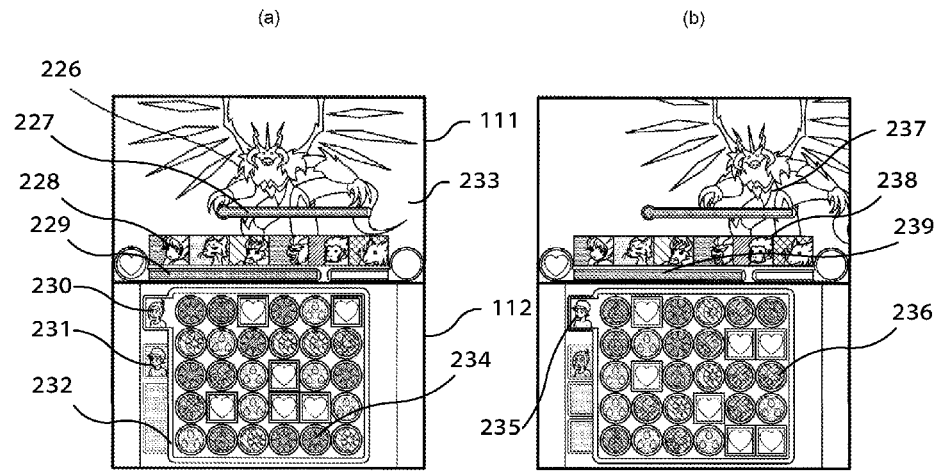
FIG. 22 is a view showing an example of a game image according to the present embodiment.

FIG. 22 is a view showing an example of a game image displayed in the competition process in the multiplay mode. Specifically, FIG. 22(a) is an image displayed in S236 and S265 of the competition process in the host terminal device. FIG. 22(b) is an image displayed in S251 and S281 of the competition process in the guest terminal device.

In FIG. 22(a), in the same manner FIG. 3, the control unit 114 causes the following to be displayed on the first display unit 111: a space 233 virtually simulating a cave; a character image 226 constituting an enemy team as the opponent; an enemy physical strength parameter gauge 227 indicating the remaining value of the physical strength parameter of a character of the enemy team; a character image 228 constituting the ally team; and an ally physical strength parameter gauge 229 indicating the remaining value of the physical strength parameter of the ally team. The control unit 114 also causes a board 232 and objects 234 arranged on the board to be displayed on the second display unit 112.

In the multiplay mode, virtually superimposed and displayed are a board on which objects operated by the first player are arranged, and a board on which objects operated by the other player playing together with the first player are arranged. Avatar images 230, 231 of the players are displayed on the left side of the boards in order to identify which player's board is the currently displayed board.

FIG. 22(*b*) shows the same display as the image (FIG. 22(*a*)) displayed in the host terminal device. In other words, the same display is made for the characters of the enemy team, the enemy physical strength parameter thereof, and the like displayed in the host terminal device.

However, the orientation of the displayed enemy team characters is different because the position in virtual space facing the enemy team is different. The displayed board and the avatar image 235 showing the player operating the displayed board is also displayed with different content than the terminal device 100-1. Furthermore, the arrangement of objects 236 displayed on the board is different from the arrangement of objects on the board of the terminal device 100-1.

In the team selection process in FIGS. 22(*a*) and (*b*), an image displayed for the case in which a predetermined number of characters to be used in the competition are selected by each player from among the character group stored in their own operated terminal device to form a single team. Therefore, in both images, the exact same display is made for the character image 228 constituting the ally team and the ally physical strength parameter gauge 229 of the ally team displayed on the host terminal device, and the character image 238 constituting the ally team and the ally physical strength parameter gauge 239 of the ally team displayed on the guest terminal device. On the other hand, in the team selection process, when a player's own team stored in a player's own terminal device is to be directly used in the competition process, the character image of the ally team selected by each player and the ally physical strength parameter thereof are displayed, and the content displayed in both terminal devices is therefore different.

Figure 23:
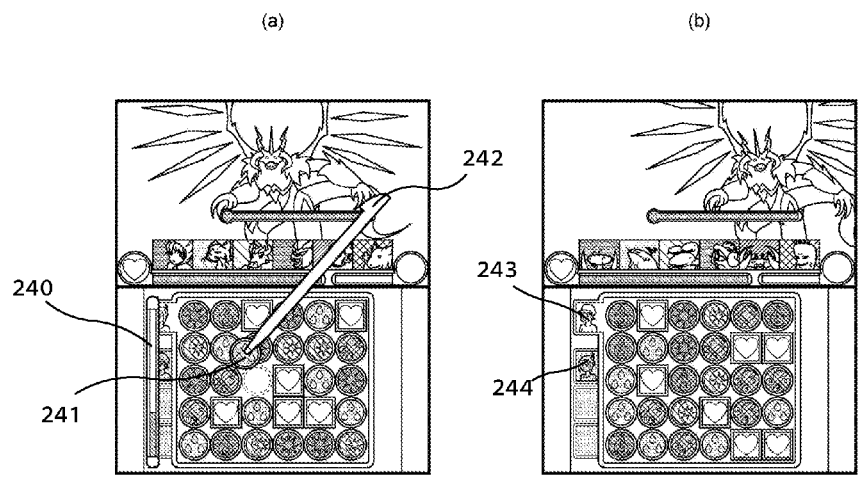
FIG. 23 is a view showing an example of a game image according to the present embodiment.

FIG. 23 is a view showing an example of a game image displayed in the competition process in the multiplay mode. Specifically, FIG. 23(*a*) is an image displayed in S237 to S239 and S266 to S268 of the competition process in the host terminal device. FIG. 22(*b*) is an image displayed on standby in S252 and S282 of the competition process in the guest terminal device.

In FIG. 23(*a*), the player touches an object 241 via the touch panel 116 to thereby start moving the object 241. The control unit 114 causes the object 241 to be displayed so as to follow the touch position thereof and move. The touched object 241 can be moved to any position on the board as long as the move occurs within a predetermined length of time. A time gauge 240 is displayed to the side of the board in order to indicate the allowed time remaining for a move.

In FIG. 23(*a*), a touch pen 242 is described as a medium for operating the touch panel 116, but it is also naturally possible for the player himself to operate the touch panel using a finger.

In FIG. 23(*b*), a board corresponding to the player operating the guest terminal device 100-2 is displayed in the guest terminal device 100-2 while the movement of the object is being carried out in the host terminal device 100-1. Instructions to move an object are blocked even if the board is touched to instruct movement of an object. In the example in FIG. 23(*b*), an avatar image 243 of the player operating the guest terminal device 100-2 is displayed on the left side of the board, and touching the avatar image 244 indicating the player operating the host terminal device 100-1 makes it possible to switch the display of the board to the same display content as the host terminal device 100-1.

Figure 24:
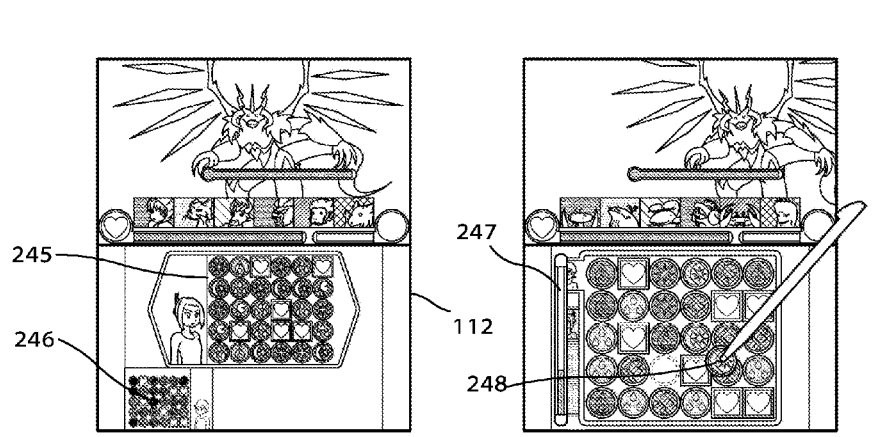
FIG. 24 is a view showing an example of a game image according to the present embodiment.

FIG. 24 is a view showing an example of a game image displayed in the competition process in the multiplay mode. Specifically, FIG. 24(*a*) is an image displayed after S241 and after S270 of the competition process in the host terminal device. FIG. 24(*b*) is an image displayed in S253 to S255 and S283 to S285 of the competition process in the guest terminal device.

In FIG. 24(*a*), the touch operation by the player ends in the terminal device 100-1, the movement position of the object is established, and the right-to-play information is transmitted to the guest terminal device 100-2. Therefore, the control unit 114 reduces the size of the board 245 and displays the board on the second display unit 112. Instructions to move an object are blocked even if the board is touched to instruct movement of an object. The board 246 displayed on the guest terminal device currently being operated is reduced and displayed to make it possible to monitor the operating state of the other player.

On the other hand, in FIG. 24(*b*), since the right-to-play information has been received from the host terminal device 100-1, movement of an object 248 arranged on the board is allowed in the guest terminal device 100-2. A time gauge 247 is displayed to the side of the board in the same manner as FIG. 23(*a*).

Figure 25:
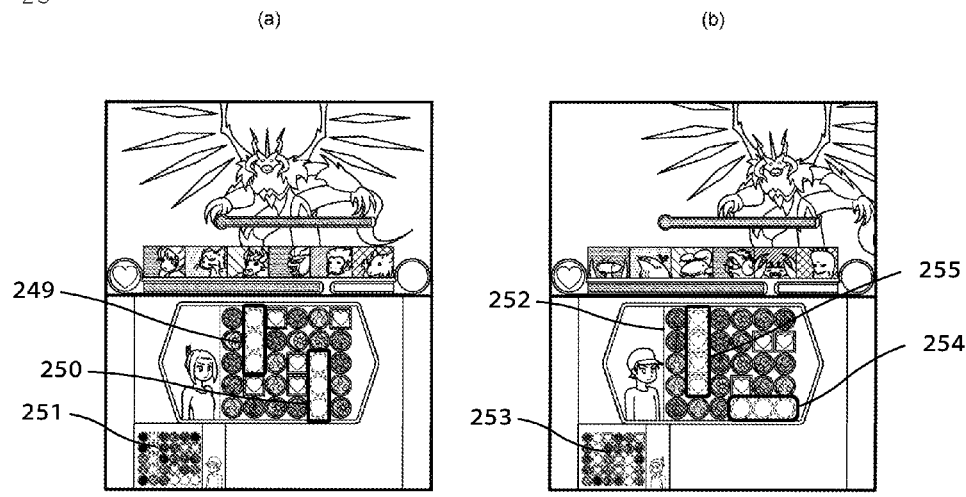
FIG. 25 is a view showing an example of a game image according to the present embodiment.

FIG. 25 is a view showing an example of a game image displayed in the competition process in the multiplay mode. Specifically, FIG. 25(*a*) is an image displayed in S242 to S243 of the competition process in the host terminal device. FIG. 25(*b*) is an image displayed in S257 to S258 of the competition process in the guest terminal device. In other words, FIG. 25 is a view showing the display units 111, 112 when movement of objects in both terminal devices has ended, and the arrangement and deletion of objects is being carried out by the placement control unit 136 of the control unit 114.

In FIG. 25(*a*), objects displayed in positions 249, 250 where three or more objects having the same attributes arranged in consecutive fashion on the board are deleted from those positions. The board 251 currently displayed on the guest terminal device is reduced and displayed to make it possible to monitor the operating state of the other player.

In FIG. 25(*b*), the touch operation by the player ends in the terminal device 100-1, the movement position of the object is established, and the board 252 displayed on the second display unit is therefore reduced in size and displayed. Instructions to move an object are blocked even if the board is touched to instruct movement of an object. The board 253 displayed on the host terminal device currently being displayed is reduced and displayed to make it possible to monitor the state of the other player's board. Furthermore, objects displayed in positions 254, 255 where three or more objects having the same attributes arranged in consecutive fashion on the board are deleted from those positions.

Figure 26:
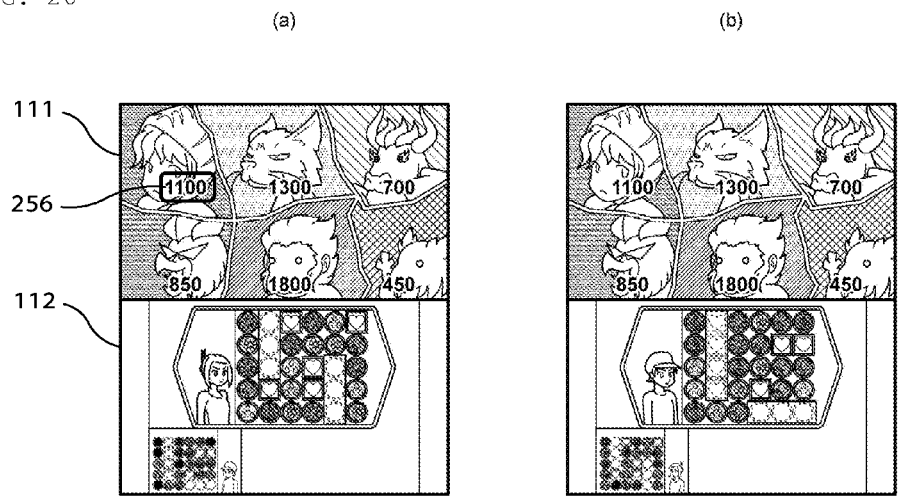
FIG. 26 is a view showing an example of a game image according to the present embodiment.

FIG. 26 is a view showing an example of a game image displayed in the competition process in the multiplay mode. Specifically, FIG. 26(*a*) is an image displayed in S248 of the competition process in the host terminal device. FIG. 26(*b*) is an image displayed in S261 of the competition process in the guest terminal device.

In FIG. 26(a), the character images of the characters constituting the ally team are enlarged and displayed on the first display unit 111. The attack power 256 obtained by adding the attack power for each attribute received from the guest terminal device 100-2 to the attack power computed by multiplying the variables with the base attack power of each character is displayed in a position corresponding to the character images.

The image in FIG. 26(b) is an image of if a predetermined number of characters to be used in the competition is selected by each player from among the character group stored in their own operated terminal device in the team selection process to form a single team. Therefore, since the configuration of the ally team is the same configuration in each terminal device, the same display as the first display unit 111 of the host terminal device 100-1 is displayed on the first display unit of the guest terminal device 100-2.

In the team selection process, if a player's own team stored in a player's own terminal device is to be directly used in the competition game, the characters constituting the ally team selected in each terminal device are different, and the content displayed in both terminal devices is therefore different.

Figure 27:
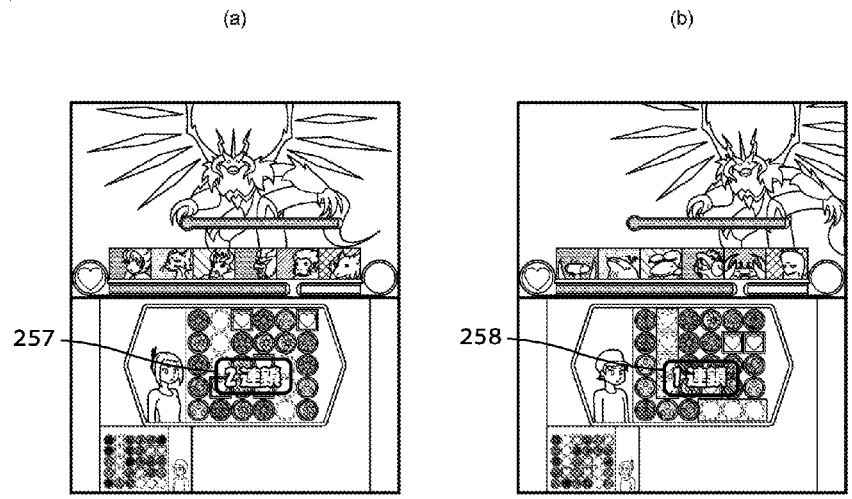
FIG. 27 is a view showing an example of a game image according to the present embodiment.

FIG. 27 is a view showing an example of a game image displayed in the competition process in the multiplay mode. Specifically, FIG. 27(a) is an image displayed in S271 of the competition process in the host terminal device. FIG. 27(b) is an image displayed in S287 of the competition process in the guest terminal device. In other words, FIG. 27 is a view showing the display units 111, 112 if movement of objects in both terminal devices has ended, and the arrangement and deletion of objects is being carried out by the placement control unit 136 of the control unit 114.

In FIGS. 27(a) and (b), the numerical values 257, 258 indicating the number of times chaining has currently occurred is displayed on both boards of the host terminal device 100-1 and the guest terminal device 100-2. If chaining is subsequently made to occur by the placement control unit 136, these numerical values are constantly increased in accordance with therewith and counted until chaining no longer occurs.

Figure 28:
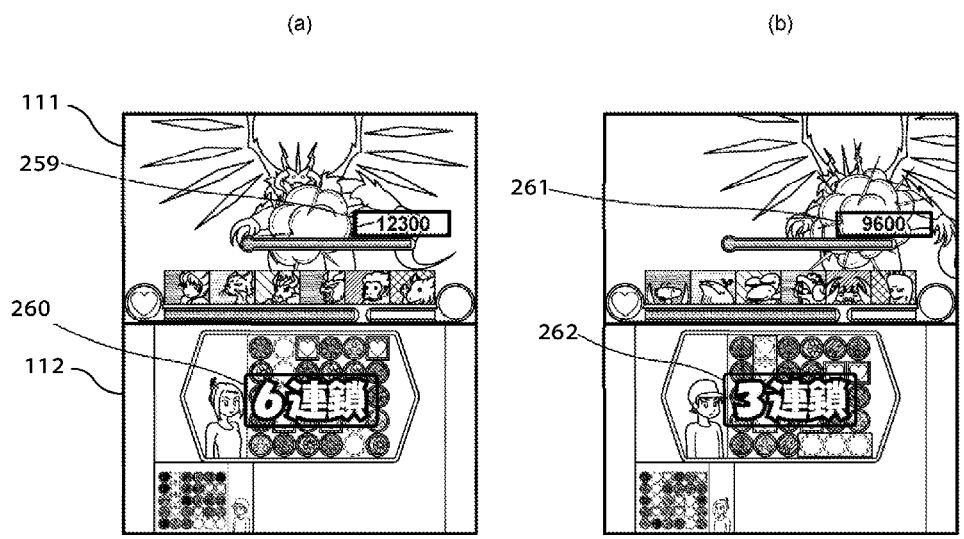
FIG. 28 is a view showing an example of a game image according to the present embodiment.

FIG. 28 is a view showing an example of a game image displayed in the competition process in the multiplay mode. Specifically, FIG. 28(a) is an image displayed in S277 of the competition process in the host terminal device. FIG. 28(b) is an image displayed in S292 of the competition process in the guest terminal device. In other words, FIG. 28 is an image displayed after the number of chains has been summed in the host terminal device 100-1 and the attack power computation process has been carried out in the terminal devices on the basis thereof.

In FIG. 28(a) the ultimate number of chains 260 counted in the number-of-chains counting process in the host terminal device 100-1 is displayed on the board of the second display unit 112. The attack power 259 calculated on the basis of the number of chains obtained by adding the above-obtained number of chains and the number of chains received from the guest terminal device 100-2 is displayed on the first display unit 111.

In FIG. 28(b), the ultimate number of chains 262 counted in the number-of-chains counting process in the guest terminal device 100-2 is displayed on the board of the second display unit. The attack power 261 calculated on the basis of the summed value of number of chains above and the number of chains received from the guest terminal device 100-2 is displayed on the first display unit.

As described above, in the present embodiment, the attack power or number of chains calculated as a result of objects arranged on the board being moved are added between communicably connected terminal devices to calculate the damage imparted to a character constituting the enemy team. Therefore, a greater attack power can be obtained in comparison with when a competitive game is carried out in the single play mode. For example, it is possible to defeat a powerful enemy team that could not be felled in the single play mode. Also, the competitive game proceeds in cooperation with another player operating another terminal device, and it is therefore possible to obtained a sense of unity with the other player. In relation to recovery power as well, it is possible to obtain a powerful recovery power that could not be obtained during single play mode.

In the present embodiment, operation of an object by another terminal device is blocked if a first terminal device is operating an object during multiplay mode. However, it is also possible to operate objects simultaneously in both terminal devices without executing processing that accompanies the blocking.

Second Embodiment

In the first embodiment, a case was described in which the game program and the like according to the embodiment are stored in the external storage medium 122, and the game program is executed in the control unit 114 of the terminal device 100-1.

Figure 29:
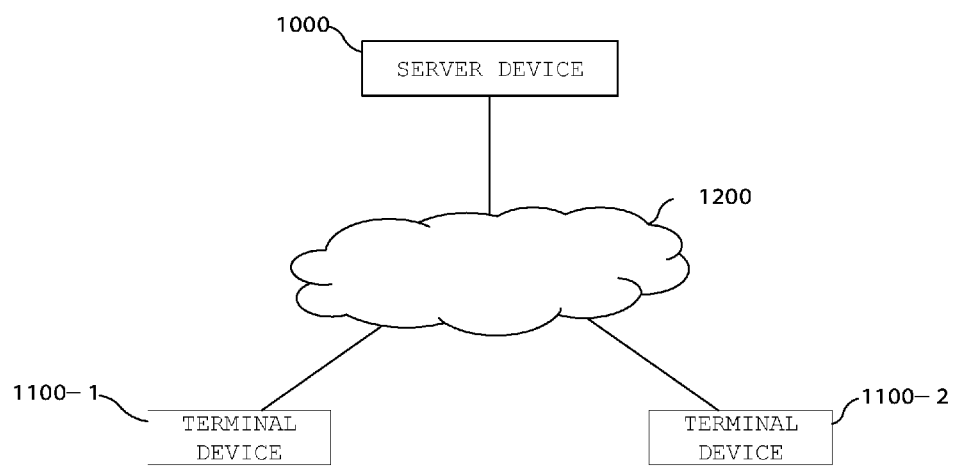
FIG. 29 is a view showing the configuration of the game system according to a second embodiment.

FIG. 29 is a view showing the configuration of the game system according to a second embodiment. In other words, in FIG. 29, terminal devices 1100-1, 1100-2 are connected to a server device 1000 via a network 1200. Processing related to the game program is carried out in the server device 1000, and results thereof are constantly distributed to the terminal devices 1100-1, 1100-2 and displayed on the terminal devices. In other words, in the present game system, the game program is a so-called "web application."

Figure 30:
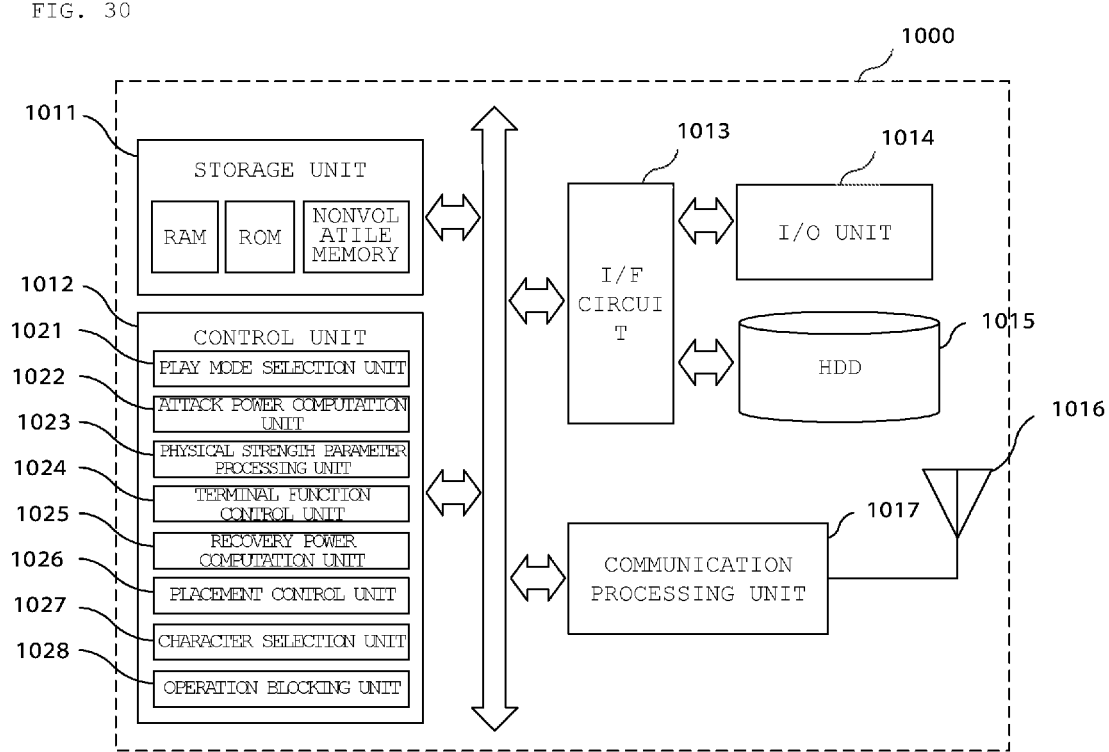
FIG. 30 is a view showing an example of the configuration of the server device in the second embodiment.

FIG. 30 is a block view showing an example of the configuration of the server device 1000 in the second embodiment. A description of functions that achieve the same function as in the terminal device 100-1 in the first embodiment is omitted.

The game program is stored in a storage unit 1011 in the server device 1000 according to the present embodiment. A control unit 1012 reads out and executes a game program from the storage unit 1011, and constantly transmits the processing results to the terminal devices 1100-1, 1100-2 via a communication processing unit 1017 and an antenna 106 when processing ends. The server device 1000 is provided with an I/O unit 1014 for connection to a CD-ROM or other recording medium via an I/F circuit 1013. A HDD 1015 is also connected to the I/F circuit 1013, and information related to a character group such as shown in FIG. 13 is stored the HDD 1015 in correlation with the player identification information assigned to each player.

In the first embodiment, it can be selected whether the terminal function control unit 134 of the terminal device is caused to function as a host terminal device or caused to function as a guest terminal device, but the terminal function control unit 1024 according to the present embodiment does not carry out such a selection process. Instead, the control unit 114 according to the present embodiment carries out in a single process a process for computing the attack power and/or recovery power, a process for summing the same, a process related to varying the physical strength parameter, and other processes required in accordance with the progress of the game for each player, and constantly transmits the processing results to the terminal devices.

Although not particularly depicted, the terminal devices 1100-1, 1100-2 are provided with at least a touch panel and/or operation or other operating unit, a communication processing unit and antenna for receiving processing results received from the server device 1000 and transmitting various commands or the like, a control unit for carrying out various controls on the basis of the processing results thus received, and a display unit for performing various displays in accordance with the control thereof. A typical example is a terminal device such as a smartphone.

As described above, in the present embodiment, the players input via an operation unit, whereby the server device mainly performs a variety of types of processes. The terminal devices 1100-1, 1100-2 merely receive and display the results thereof, and the processing flow carried out by executing the game program is the same as in the first embodiment.

Third Embodiment

Figure 31:
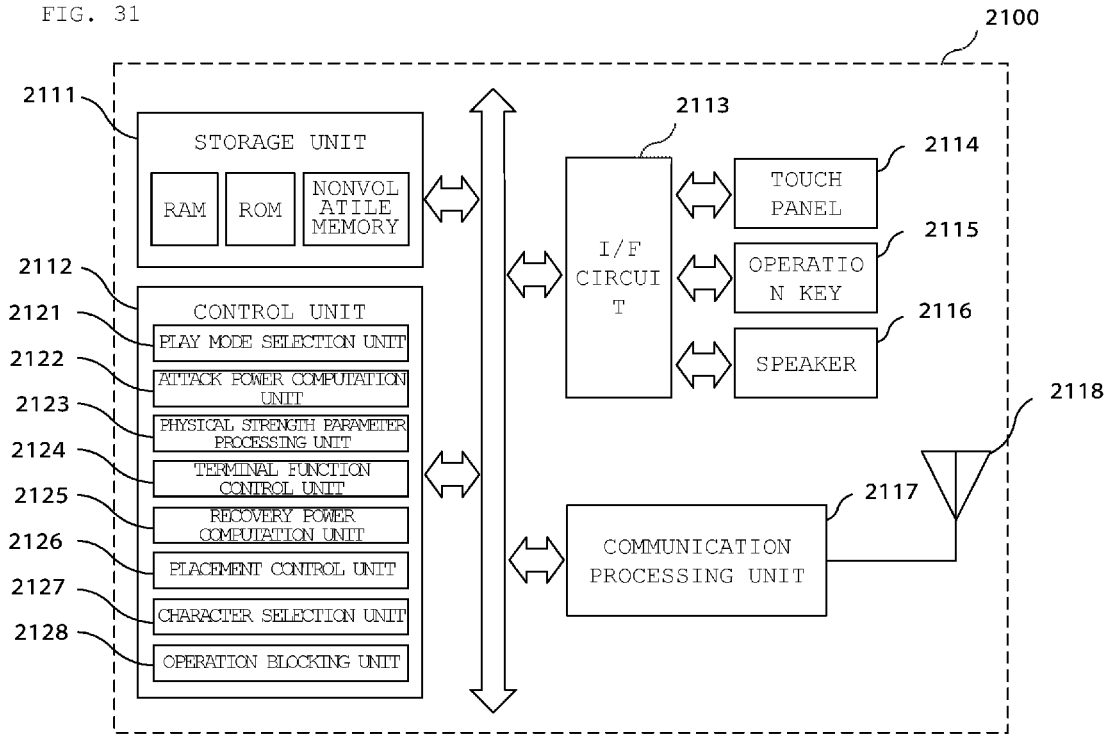
FIG. 31 is a view showing the configuration of the terminal device according to the third embodiment.

FIG. 31 is a view showing the configuration of the terminal device 2100 according to the third embodiment. In other words, in the third embodiment, the terminal devices are connected to a server device via a network in the same manner as in the second embodiment. However, this embodiment is different from the second embodiment in that a variety of types of processes related to the game program is not carried out in the server device, but the entire game program and the like are rather downloaded in a single process in advance from the server device, or the game program and the like required for processing is constantly downloaded in accordance with the progress of the game, and a variety of types of processes is carried out in the control unit of the terminal devices. In other words, in the present game system, the game program is a so-called "native application."

Although not particularly depicted, the server device of the present embodiment is provided with at least: a storage unit for storing the game program, various data required for processing thereof, and information of each player; a control unit; and an antenna and communication processing unit for communication with terminal devices.

In FIG. 31, the terminal device 2100 is provided with a storage unit 2111 which stores the game program received from the server device via a communication processing unit 2117 and an antenna 2118. A control unit 2112 carries out a variety of types of processes on the basis of the game program thus received. The processing flow is the same as that of the first embodiment. A typical example of such a terminal device 2100 is a smartphone.

The configuration is otherwise the same as that in the first embodiment, and a description is therefor omitted.

In the present embodiment, it is also possible to cause either terminal device to function as a host terminal device and the other terminal device to function as a guest terminal device in the same manner as the first embodiment without using a server device as an intermediary. On the other hand, it is also possible to constantly use the server device to coordinate with the other terminal device and to have the server device carry out only functions related to transmission and the process of summing various computation results.

Information about the character group such as that in FIG. 13 may be stored in the storage unit 2111 of the terminal device 2100, or may be stored in correlation with player identification information in a storage unit in the server device and downloaded as required on each occasion to make use of the various character information.

The processes and procedures described in the present specification can be implemented not only in accordance with the explicit description in the embodiments, but also by software, hardware, or a combination thereof. Specifically, the processes and procedures described in the present specification may be implemented by mounting logic corresponding to the processes in an integrated circuit, volatile memory, nonvolatile memory, a magnetic disk, optical storage, or another medium. The processes and procedures described in the present specification may also be mounted as a computer program and executed in various computers.

The processes and procedures described in the present specification are described as being executed in a single device, software unit, component, and module. However, such processes and procedures may be executed by a plurality of devices, a plurality of software units, a plurality of components, and/or a plurality of modules. The data, tables, and databases described in the present specification area described as being stored in a single memory. However, such data, tables, and databases can be stored in a dispersive manner in a plurality of memories provided to a single device or a plurality of memories dispersed and arranged in a plurality of devices. Furthermore, the software and hardware elements described in the present specification can be incorporated in fewer constituent elements or may be implemented by division into a greater number of constituent elements.

EXPLANATION OF NUMERALS AND CHARACTERS

100-1 Terminal device
111 First display unit
112 Second display unit
113 Storage unit
114 Control unit
122 External storage medium

The invention claimed is:

1. A terminal device for controlling progress of an electronic game by determining attack power of one or more characters constituting an ally team on the basis of a first player operating a plurality of objects disposed on a board formed by m rows and n columns and displayed on a display unit, applying an attack with the attack power to one or more characters constituting an enemy team, and varying a remaining value of a physical strength parameter related to the one or more characters constituting the enemy team, the terminal device comprising:

an operation unit for receiving operation by the first player;

a communication processing unit for processing communication with the terminal device operated by another player;

a play mode selection unit for selecting whether to proceed with the game in a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by the plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received via the communication processing unit from the terminal device operated by another player; and a physical strength parameter processing unit for varying the remaining value of the physical strength parameter on the basis of the attack power computed by the attack power computation unit;

wherein during multiplay mode selection, a placement control unit displays a board comprising objects operated by the first player superimposed with objects operated by the another player, wherein an order of the superimposition and a display size of the board is varied in accordance with a progress of the electronic game.

2. The terminal device according to claim 1, comprising a terminal function control unit for selecting whether to cause the terminal device to function as a host terminal device or cause the terminal device to function as a guest terminal device at the time of multiplay mode selection.

3. The terminal device according to claim 2, wherein the result is received via the communication processing unit from the terminal device operated by another player if a selection is made in the terminal function control unit to cause the terminal device to function as a host terminal device.

4. The terminal device according to claim 2, wherein the result obtained by operation of the objects via the operating unit of the first player is transmitted via the communication processing unit to the terminal device operated by another player if a selection is made in the terminal function control unit to cause the terminal device to function as a guest terminal device.

5. The terminal device according to claim 1, further comprising a recovery power computation unit for computing, if the single play mode has been selected, the recovery power for recovering the remaining value of the physical strength parameter related to the ally team on the basis of the result obtained by operation of the objects via the operating unit of the first player, and computing, if the multiplay mode has been selected, the recovery power on the basis of the result obtained by operation of the objects via the operating unit of the first player and the result received via the communication processing unit from the terminal device operated by another player;

the physical strength parameter processing unit recovering the remaining value of the physical strength parameter related to the ally team on the basis of the recovery power computed in the recovery power computation unit.

6. The terminal device according to claim 1, wherein each of the plurality of objects has a predetermined attribute, and the predetermined state is a state in which objects having the same attribute are consecutively lined up in a row in the vertical or horizontal direction.

7. The terminal device according to claim 6, further comprising a placement control unit that, if a predetermined number of objects having the same attribute are consecutively lined up in a row in the vertical or horizontal direction, deletes the consecutive objects from the board, and arranges different objects in the deleted positions on the board.

8. The terminal device according to claim 7, wherein, if a predetermined number of objects having the same attribute are again consecutively lined up in a row in the vertical or horizontal direction by the placement, the placement control unit deletes the consecutive objects from the board, arranges different objects in the deleted positions on the board, and repeats deletion and arrangement of objects until a predetermined number of objects having the same attribute are not lined up in a row in the vertical or horizontal direction.

9. The terminal device according to claim 7, wherein the result is the number of objects deleted by the placement control unit.

10. The terminal device according to claim 8, wherein the result is the number of repetitions of deletion and arrangement of objects performed by the placement control unit.

11. The terminal device according to claim 1, comprising a character selection unit for selecting a character to constitute the ally team from a character group comprising a plurality of characters.

12. The terminal device according to claim 11, wherein, during multiplay mode selection, the character selection unit constitutes the ally team to be used by the first player from characters selected in the terminal device operated by the first player and characters received from the terminal device operated by another player.

13. The terminal device according to claim 11, wherein, during multiplay mode selection, the character selection unit constitutes the ally team to be used by the first player only from characters selected in the terminal device operated by the first player.

14. The terminal device according to claim 1, comprising an operation blocking unit for blocking operation of an object displayed on the terminal device of the first player if, during multiplay mode selection, an object displayed on the terminal device of another player is being operated.

15. The terminal device according to claim 1, wherein, during multiplay mode selection, the placement control unit causes the arrangement of objects operated by the first player to be different from the arrangement of objects operated by another player.

16. A non-transitory computer-readable medium in which a computer program characterized in causing a computer used as a terminal device operated by a first player to control progress of a game by determining attack power of one or more characters constituting an ally team on the basis of the first player operating a plurality of objects disposed on a board formed by m rows and n columns and displayed on a display unit, applying the attack with the attack power to one or more characters constituting an enemy team, and varying the remaining value of a physical strength parameter related to the character constituting the enemy team, the computer program causing the computer to function as:

a play mode selection unit for selecting whether to proceed with the game in either of a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received from the terminal device operated by another player; and a physical strength parameter processing unit for varying the remaining value of the physical strength parameter on the basis of the attack power computed by the attack power computation unit;

wherein during multiplay mode selection, a placement control unit displays a board comprising objects operated by the first player superimposed with objects operated by the another player, wherein an order of the superimposition and a display size of the board is varied in accordance with a progress of the electronic game.

17. A server device for controlling progress of a game by determining attack power of one or more characters constituting an ally team on the basis of a player operating a plurality of objects disposed on a board formed by m rows and n columns, applying an attack with the attack power to one or more characters constituting an enemy team, and varying the remaining value of a physical strength parameter related to the character constituting the enemy team, the server device comprising:

a play mode selection unit for selecting whether to proceed with the game in a single play mode in which a single player competes against the enemy team alone or a multiplay mode in which the single player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the single player, and, if multiplay mode has been selected by the play mode selection unit, computes the attack power on the basis of the result obtained by the objects being operated via the operation unit of the single player and the result obtained by operation of the objects arranged on the board displayed on the terminal device of another player; and a physical strength parameter processing unit for varying the remaining value of the physical strength parameter on the basis of the attack power computed by the attack power computation unit;

wherein during multiplay mode selection, a placement control unit displays a board comprising objects operated by the first player superimposed with objects operated by the another player, wherein an order of the superimposition and a display size of the board is varied in accordance with a progress of the electronic game.

18. A terminal device for controlling progress of an electronic game by determining attack power of one or more characters constituting an ally team on the basis of a first player operating a plurality of objects disposed on a board formed by m rows and n columns and displayed on a display unit, applying an attack with the attack power to one or more characters constituting an enemy team, and varying a remaining value of a physical strength parameter related to the one or more characters constituting the enemy team, the terminal device comprising:

an operation unit for receiving operation by the first player;

a communication processing unit for processing communication with the terminal device operated by another player;

a play mode selection unit for selecting whether to proceed with the game in a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by the plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received via the communication processing unit from the terminal device operated by another player;

a physical strength parameter processing unit for varying the remaining value of the physical strength parameter on the basis of the attack power computed by the attack power computation unit; and an operation blocking unit for blocking operation of an object displayed on the terminal device of the first player if, during the multiplay mode selection, an object displayed on the terminal device of the another player is being operated.

19. A terminal device for controlling progress of an electronic game by determining attack power of one or more characters constituting an ally team on the basis of a first player operating a plurality of objects disposed on a board formed by m rows and n columns and displayed on a display unit, applying an attack with the attack power to one or more characters constituting an enemy team, and varying a remaining value of a physical strength parameter related to the one or more characters constituting the enemy team, the terminal device comprising:

an operation unit for receiving operation by the first player;

a communication processing unit for processing communication with the terminal device operated by another player;

a play mode selection unit for selecting whether to proceed with the game in a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by the plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received via the communication processing unit from the terminal device operated by another player; and a physical strength parameter processing unit for varying the remaining value of the physical strength parameter on the basis of the attack power computed by the attack power computation unit; and during multiplay mode selection, a placement control unit for causing the arrangement of objects operated by the first player to be different from the arrangement of objects operated by the another player.

20. A non-transitory computer-readable medium in which a computer program characterized in causing a computer used as a terminal device operated by a first player to control progress of an electronic game by determining attack power of one or more characters constituting an ally team on the basis of the first player operating a plurality of objects disposed on a board formed by m rows and n columns and displayed on a display unit, applying the attack with the attack power to one or more characters constituting an enemy team, and varying a remaining value of a physical strength parameter related to one or more characters constituting the enemy team, the computer program causing the computer to function as:

a play mode selection unit for selecting whether to proceed with the game in either of a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received from the terminal device operated by another player;

a physical strength parameter processing unit for varying the remaining value of the physical strength parameter on the basis of the attack power computed by the attack power computation unit; and an operation blocking unit for blocking operation of an object displayed on the terminal device of the first player if, during the multiplay mode selection, an object displayed on the terminal device of the another player is being operated.

21. A non-transitory computer-readable medium in which a computer program characterized in causing a computer used as a terminal device operated by a first player to control progress of an electronic game by determining attack power of one or more characters constituting an ally team on the basis of the first player operating a plurality of objects disposed on a board formed by m rows and n columns and displayed on a display unit, applying the attack with the attack power to one or more characters constituting an enemy team, and varying a remaining value of a physical strength parameter related to one or more characters constituting the enemy team, the computer program causing the computer to function as:

a play mode selection unit for selecting whether to proceed with the game in either of a single play mode in which the first player competes against the enemy team alone or a multiplay mode in which the first player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the first player, and, if multiplay mode has been selected by the play mode selection unit, computes the attack power on the basis of the result obtained by the objects being operated via the operation unit of the first player and the result received from the terminal device operated by another player;

a physical strength parameter processing unit for varying the remaining value of the physical strength parameter on the basis of the attack power computed by the attack power computation unit; and during multiplay mode selection, a placement control unit for causing the arrangement of objects operated by the first player to be different from the arrangement of objects operated by the another player.

22. A server device for controlling progress of an electronic game by determining attack power of one or more characters constituting an ally team on the basis of a player operating a plurality of objects disposed on a board formed by m rows and n columns, applying an attack with the attack power to one or more characters constituting an enemy team, and varying a remaining value of a physical strength parameter related to one or more characters constituting the enemy team, the server device comprising:

a play mode selection unit for selecting whether to proceed with the game in a single play mode in which a single player competes against the enemy team alone or a multiplay mode in which the single player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the single player, and, if multiplay mode has been selected by the play mode selection unit, computes the attack power on the basis of the result obtained by the objects being operated via the operation unit of the single player and the result obtained by operation of the objects arranged on the board displayed on the terminal device of another player;

a physical strength parameter processing unit for varying the remaining value of the physical strength parameter on the basis of the attack power computed by the attack power computation unit; and an operation blocking unit for blocking operation of an object displayed on the terminal device of the first player if, during the multiplay mode selection, an object displayed on the terminal device of the another player is being operated.

23. A server device for controlling progress of an electronic game by determining attack power of one or more characters constituting an ally team on the basis of a player operating a plurality of objects disposed on a board formed by m rows and n columns, applying an attack with the attack power to one or more characters constituting an enemy team, and varying a remaining value of a physical strength parameter related to one or more characters constituting the enemy team, the server device comprising:

a play mode selection unit for selecting whether to proceed with the game in a single play mode in which a single player competes against the enemy team alone or a multiplay mode in which the single player and another player cooperate to compete against the enemy team;

an attack power computation unit that, if single play mode has been selected by the play mode selection unit, computes the attack power on the basis of a result obtained by a plurality of objects disposed on the board being placed in a predetermined state by an operation of the objects via the operation unit of the single player, and, if multiplay mode has been selected by the play mode selection unit, computes the attack power on the basis of the result obtained by the objects being operated via the operation unit of the single player and the result obtained by operation of the objects arranged on the board displayed on the terminal device of another player;

a physical strength parameter processing unit for varying the remaining value of the physical strength parameter on the basis of the attack power computed by the attack power computation unit; and during multiplay mode selection, a placement control unit for causing the arrangement of objects operated by the first player to be different from the arrangement of objects operated by the another player.

* * * * *